US00RE34344E

United States Patent [19]

Sakato et al.

[11] E Patent Number: Re. 34,344

[45] Reissued Date of Patent: Aug. 17, 1993

[54] DEVELOPING DEVICE

[75] Inventors: Shingo Sakato, Takatsuki; Eiichi Tone, Osaka; Shuji Fujisawa, Kadoma; Takeshi Tsuda, Izumi; Yousuke Ohata, Osaka; Hiroshi Hiraoka, Sakai, all of Japan

[73] Assignee: Mita Industrial Co., Ltd., Osaka, Japan

[21] Appl. No.: 735,905

[22] Filed: Jul. 25, 1991

Related U.S. Patent Documents

Reissue of:

[64] Patent No.: 4,851,873
Issued: Jul. 25, 1989
Appl. No.: 122,239
Filed: Nov. 17, 1987

[30] Foreign Application Priority Data

Nov. 28, 1986 [JP] Japan ..... 61-285562
Mar. 3, 1987 [JP] Japan ..... 62-46697

[51] Int. Cl.[5] ..... G03G 15/08

[52] U.S. Cl. ..... 355/245; 355/260; 430/120

[58] Field of Search ..... 355/245, 251, 259, 260; 118/653, 656–658; 222/DIG. 1; 430/120

[56] References Cited

U.S. PATENT DOCUMENTS

| | | | |
|---|---|---|---|
| 3,970,042 | 7/1976 | Rees | 355/645 |
| 4,062,385 | 12/1977 | Katusha et al. | 222/DIG. 1 |
| 4,185,907 | 1/1980 | Baier et al. | 355/200 |
| 4,336,994 | 6/1982 | Banton | 355/4 |
| 4,339,196 | 7/1982 | Beck et al. | 355/3 DD |
| 4,491,161 | 1/1985 | Tamura et al. | 355/260 |
| 4,563,074 | 1/1986 | Tsutsui et al. | 355/3 DD |
| 4,583,832 | 4/1986 | Kasamura et al. | 355/3 DD |
| 4,615,605 | 10/1986 | Kida et al. | 355/3 R |
| 4,692,018 | 9/1987 | Tamura | 355/3 R |
| 4,740,767 | 4/1988 | Kawano et al. | 355/3 DD |
| 4,801,966 | 1/1989 | Ikeda | 355/245 |
| 4,814,816 | 3/1989 | Idenawa | 118/657 X |
| 4,954,844 | 9/1990 | Morita et al. | 355/260 |
| 4,972,887 | 11/1990 | Hacknauer et al. | 355/260 X |

FOREIGN PATENT DOCUMENTS

| | | |
|---|---|---|
| 0101303 | 2/1984 | European Pat. Off. . |
| 2428378 | 1/1980 | France . |
| 58-57151 | 4/1983 | Japan . |
| 61-63871 | 4/1986 | Japan . |

OTHER PUBLICATIONS

Research Disclosure, No. 17564, Nov. 1978, pp. 35–36; "Device for Mounting Developing Apparatus in Position for Use in Electrophotographic Copier".
European Search Report.
Annex to European Search Report.

*Primary Examiner*—A. T. Grimley
*Assistant Examiner*—William J. Royer
*Attorney, Agent, or Firm*—Wenderoth, Lind & Ponack

[57] ABSTRACT

A developing device includes a developing section provided with an applicator for applying a developer to a latent electrostatic image and a supporting section for supporting the developing section turnably between an operating position at which the developer held on the applicator acts on image-bearing member and a non-operating position at which the developer held on the applicator does not substantially act on the image-bearing member. According to a first aspect, positioning device acts on the developing section and holds it at the operating position. According to a second aspect, there is provided device for holding the developing section at the non-operating position at the time of mounting a main body of the developing device on an image-forming machine. According to a third aspect, when the main body of the developing device is mounted on the image-forming machine, electrical connecters provided thereon are electrically coupled to each other. According to a fourth aspect, a toner cartridge loaded detachably into the main body of the developing device, not necessarily of the above type, cannot be detached from the main body of the developing device unless its discharge opening is closed with a cover member.

23 Claims, 14 Drawing Sheets

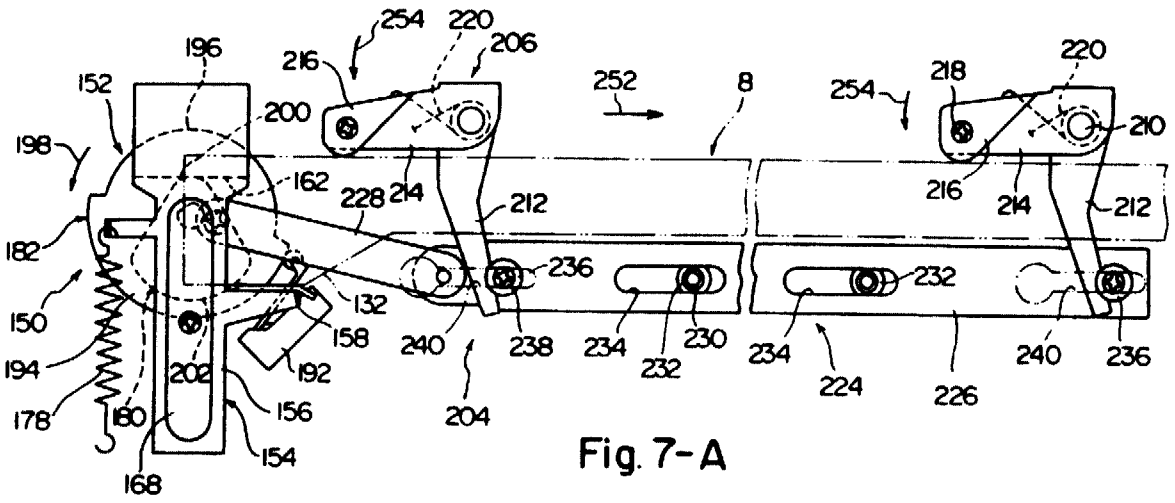
Fig. 7-A
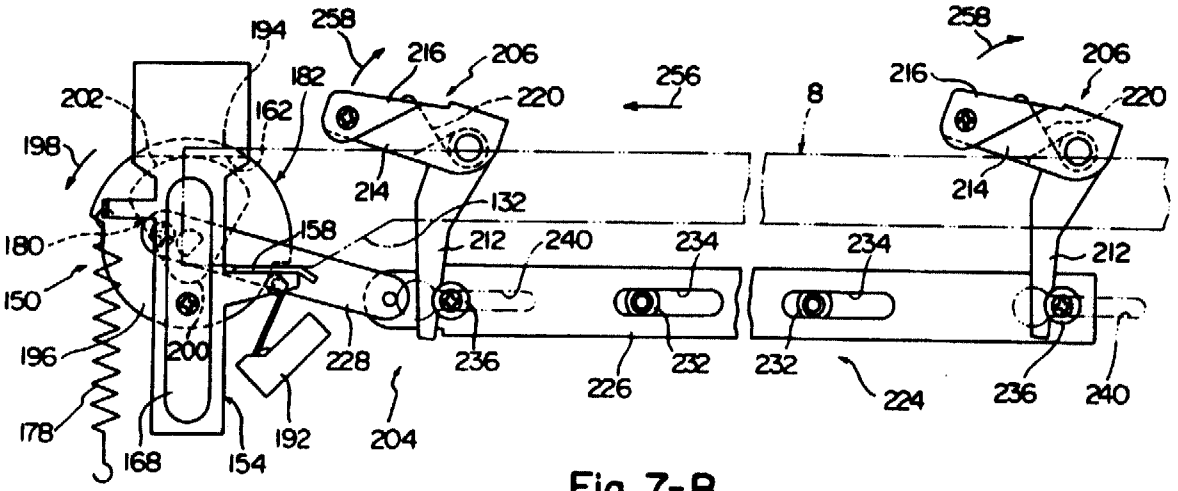
Fig. 7-B

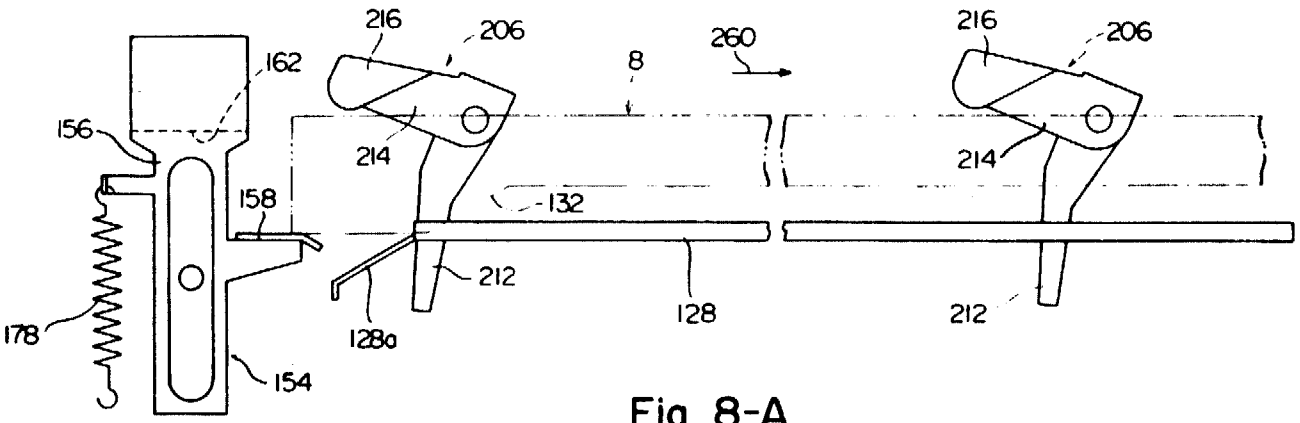
Fig. 8-A
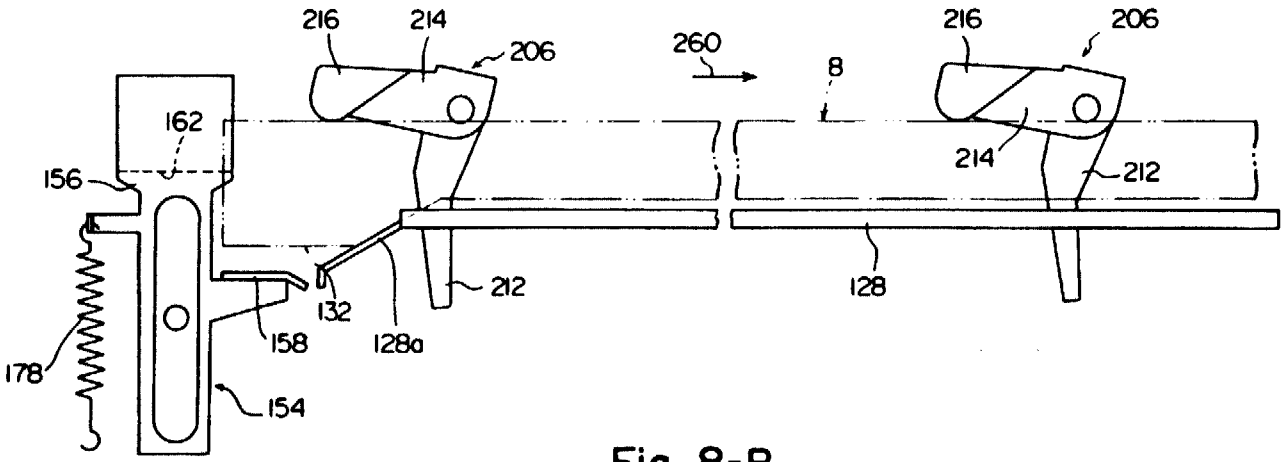
Fig. 8-B

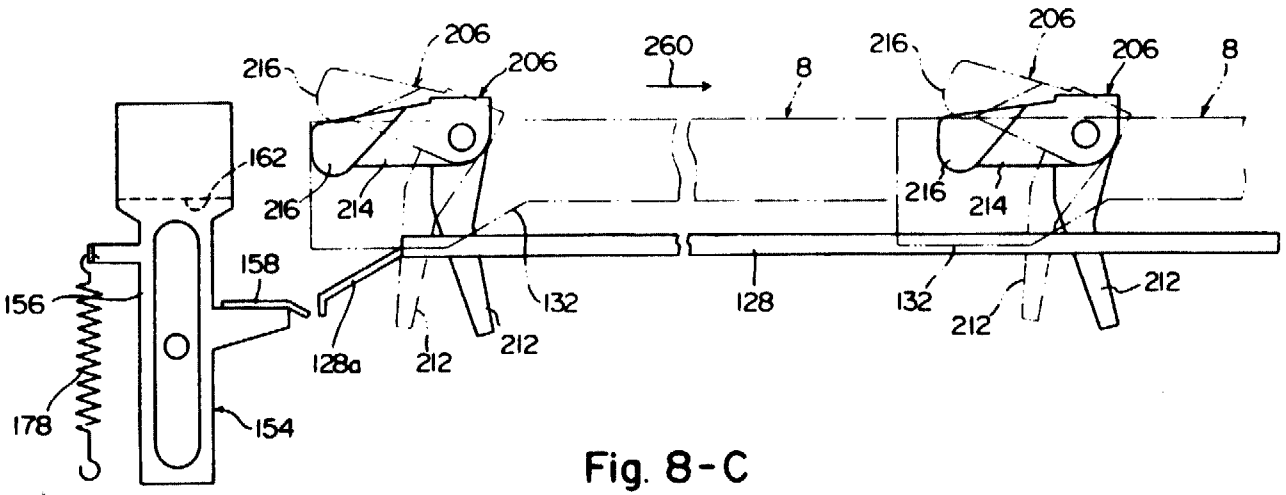
Fig. 8-C

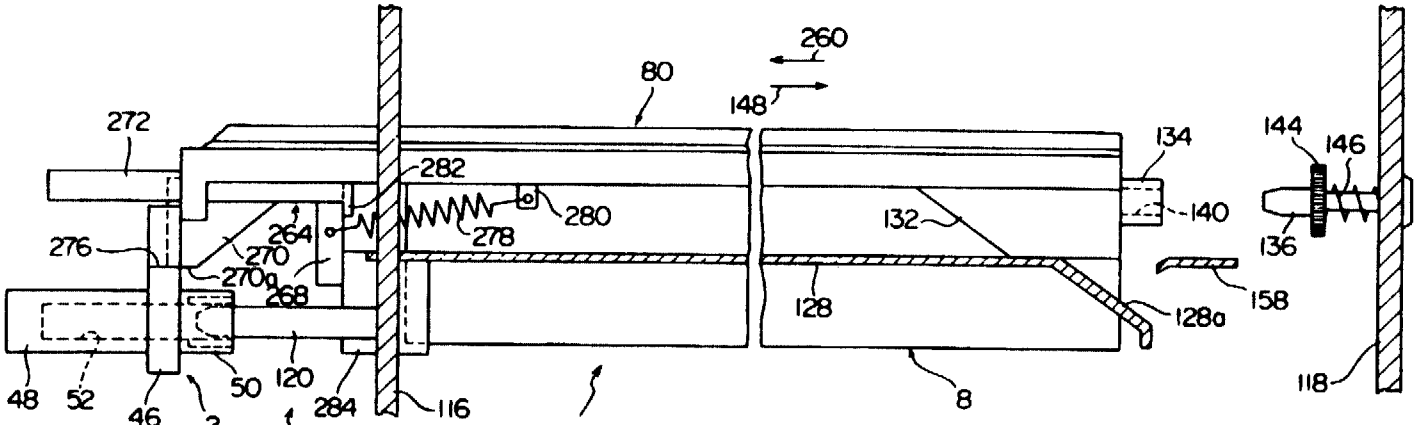
Fig. 9-A
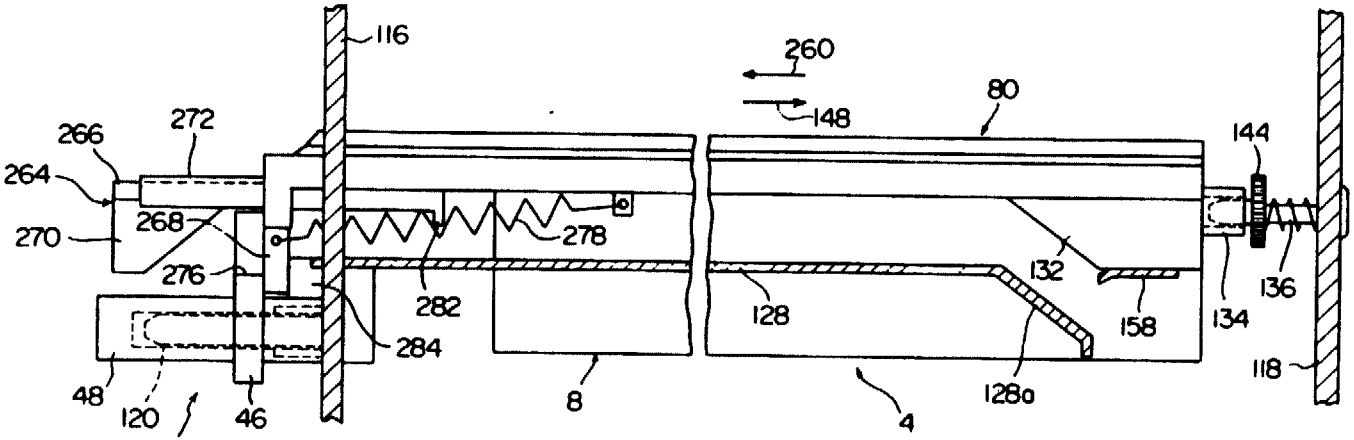
Fig. 9-B

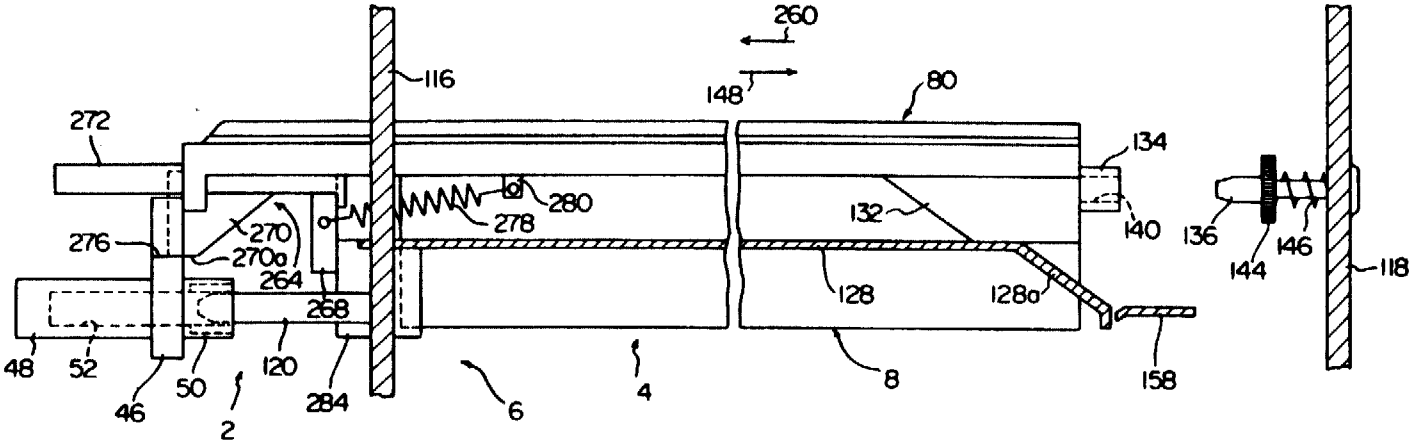
Fig. 10-A
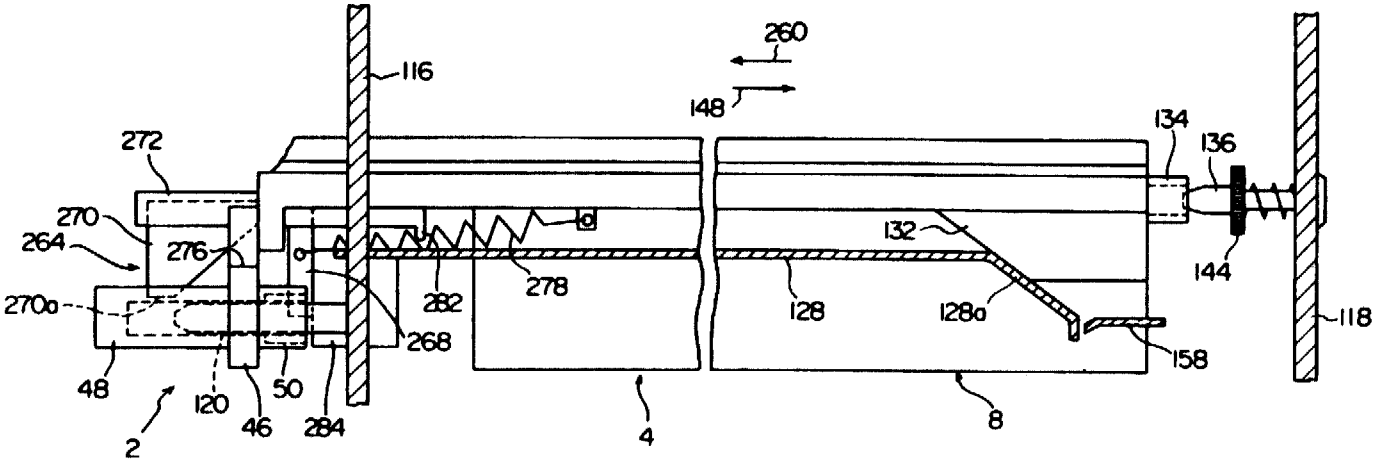
Fig. 10-B

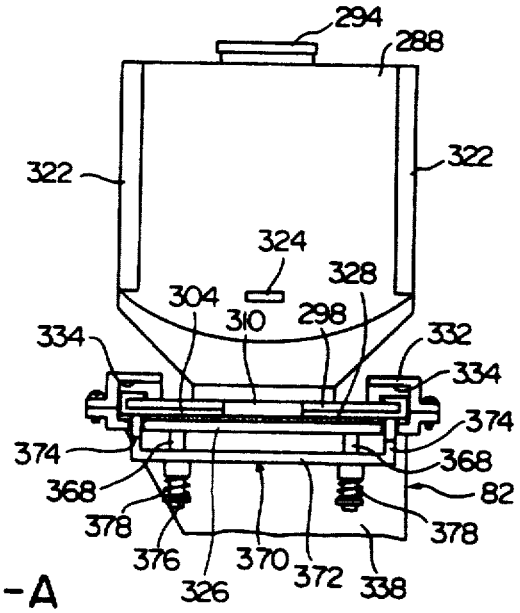
Fig. 12
Fig. 13-A
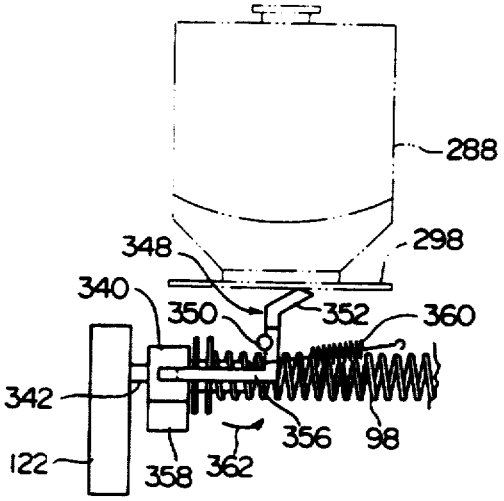
Fig. 13-B
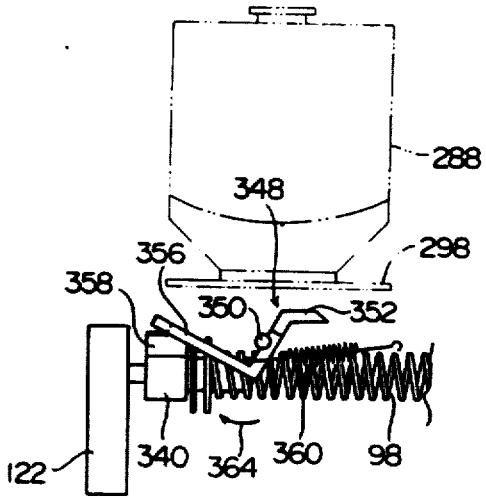

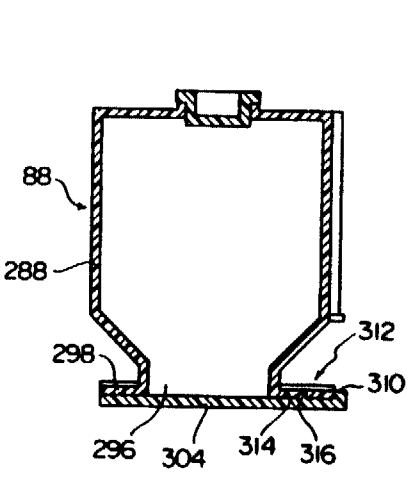
Fig. 14-C
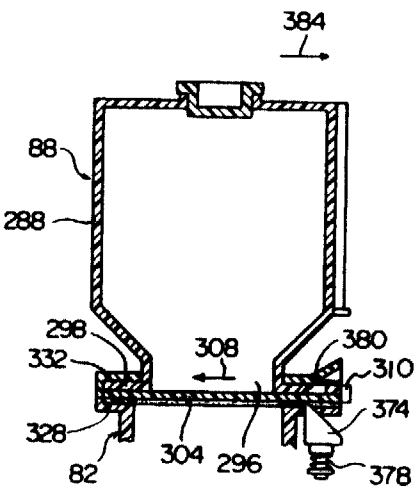
Fig. 14-B
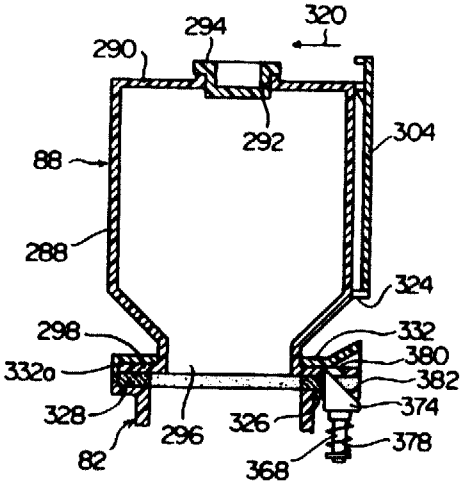
Fig. 14-A

DEVELOPING DEVICE

Matter enclosed in heavy brackets [ ] appears in the original patent but forms no part of this reissue specification; matter printed in italics indicates the additions made by reissue.

FIELD OF THE INVENTION

This invention relates to a developing device which can be applied to an image-forming machine such as an electrostatic copying machine and an electrostatic printing machine.

DESCRIPTION OF THE PRIOR ART

An image-forming machine such as an electrostatic copying machine is equipped with a developing device for developing a resulting latent electrostatic image to a toner image. Generally, such a developing device is adapted to be mounted on and detached from the main body of the image-forming machine to facilitate maintenance of the developing device itself, or to enable the developing device to be replaced in the case of monocolor copying (see, for example, Japanese Laid-Open Patent Publication No. 229072/1985).

A conventional developing device such as the one disclosed in the above-cited Japanese Laid-Open Patent Publication No. 229072/1985 is of such a structure as can be mounted detachably on the image-forming machine by moving it vertically. Because of this structure, the mounting and detaching operations of the developing device are not easy. Furthermore, since a space should be provided in main body of the image-forming machine for mounting and detaching the developing device, the image-forming machine increases in size.

There also exists a developing device of the type which is mounted movably between an operating position near an electrophotographic material at which position a developer in the developing device acts on the electrophotographic material and a non-operating position spaced from the electrophotographic material at which position the developer does not substantially act on the electrophotographic material, and which is brought to the above non-operating position at the time of mounting and detaching the developing device in order to avoid damage to the electrophotographic material (see, for example, Japanese Laid-Open Utility Model Publication No. 52746/1981). However, since this conventional developing device is movable horizontally between the operating position and the non-operating position, a relatively large space is required for the developing device and it is difficult to build the image-forming device to be of small size.

In an attempt to eliminate the various defects of the prior art, these has been proposed an improved developing device disclosed in the specification and drawings of Japanese Patent Application No. 235929/1986 (entitled: DEVELOPING DEVICE). This improved developing device comprises a main body having a developing section equipped with applicator means for applying a developer and a supporting section for supporting the developing section rotatably between an operating position and a non-operating position, and a changeover mechanism disposed in an image-forming machine for selectively holding the developing section at the operating position and the non-operating position. This developing device still has defects described below.

Firstly, the developing section of the main body of the developing device is held at the above operating position by a biasing spring attached to the developing section and by the weight of the developing section. Since the biasing force of the biasing spring cannot be increased substantially because of the need to permit easy mounting and detaching of the main body of the developing device, the developing section is difficult to hold exactly at the operating position.

Secondly with regard to the biasing spring attached to the developing section, the supporting section should be pivoted against the biasing action of the spring at the time of mounting the main body of the developing device. Otherwise, the developing device cannot be mounted in position on the image-forming machine. Hence, the mounting operation of the main body of the developing device is somewhat complex.

Thirdly, electrical connecting terminals connected releasably to each other are provided on the main body of the developing device and the main body of the image-forming machine in order to provide a bias voltage to the applicator means in the developing section. Connection and release of the electrical connecting terminals require relatively complex operations.

Fourthly, not necessarily with regard to the above developing device, there have widely been used developing devices of the toner supply type which comprise a main body equipped with developer applicator means and a toner cartridge detachably mounted on the main body. The toner cartridge in the developing devices of this type includes a cartridge body and a cover member for closing a toner supply opening formed in the cartridge body. The cover member is attached over the toner supply opening when the cartridge body is to be detached from the main body of the developing device. This prevents scattering of the toner remaining in the cartridge body at the time of detaching. In the conventional developing device, the cartridge body can be detached from the main body of the developing device even when the cover member is not attached to the toner supply opening. If, therefore, the cartridge body is detached from the developing device by error, the toner inside it scatters through the toner supply opening.

SUMMARY OF THE INVENTION

A first object of this invention is to provide an improved developing device in which a developing section movable between an operating position and a non-operating position can be accurately held at the operating position.

A second object of this invention is to provide an improved developing device in which a main body thereof can be detachably mounted on the main body of an image-forming machine with simplicity and ease.

A third object of this invention is to provide an improved developing device in which electrical connecting means provided in the main body thereof can be easily coupled electrically to electrical connecting means provided in the main body of the image-forming machine.

A fourth object of this invention is to provide an improved developing device in which when a cartridge body is to be detached from the main body of the developing device, scattering of a toner from the cartridge body can be accurately prevented.

Other objects and features of this invention will become apparent from the following description.

BRIEF DESCRIPTION OF THE DRAWINGS

FIG. 7-A and 7-B are respectively a front view showing a first cam of the changeover mechanism as it is held at a second angular position, and a front view showing the first cam of the changeover mechanism as it is held at a first angular position.

FIG. 8-A, 8-B and 8-C are partial views showing;, the state of pressing members in positioning means when an elevating-lowering member of the changeover mechanism is at an elevated position, and the movement of the pressing members when the main body of the developing device is detached while the elevating lowering member is at a lowered position.

FIG. 9-A and 9-B are views respectively showing, partly in section, the main body of the developing device as it is moved in the mounting direction and the detaching direction when the elevating-lowering member is at the elevated position.

FIGS. 10-A and 10-B are views respectively showing the main body of the developing device as it is moved in the mounting direction and the detaching direction when the elevating-lowering member is at the lowered position.

FIG. 12 is a partial front view showing a cartridge body and a cover member as they are mounted on a cartridge loading portion of the main body of the developing device.

FIGS. 13-A and 13-B are views explaining the movement of discharge facilitating means attached to the main body of the developing device.

FIGS. 14-A to 14-C are sectional views explaining the operation of loading the cartridge body on the main body of the developing device and the operation of detaching it from the main body of the developing device.

DETAILED DESCRIPTION OF PREFERRED EMBODIMENTS

With reference to the accompanying drawings, one embodiment of the developing device constructed in accordance with this invention will be described.

OUTLINE OF THE DEVELOPING DEVICE

The outline of the developing device in such embodiment will be described with reference to FIG. 1.

Figure 1:
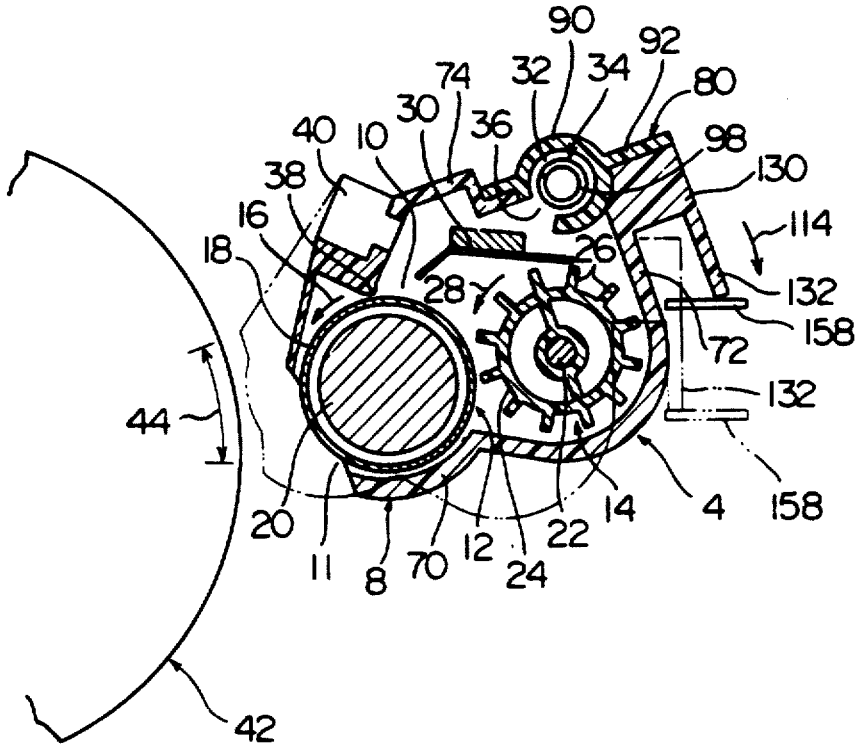
FIG. 1 is a sectional view showing one embodiment of the developing device constructed in accordance with this invention.
Figure 2:
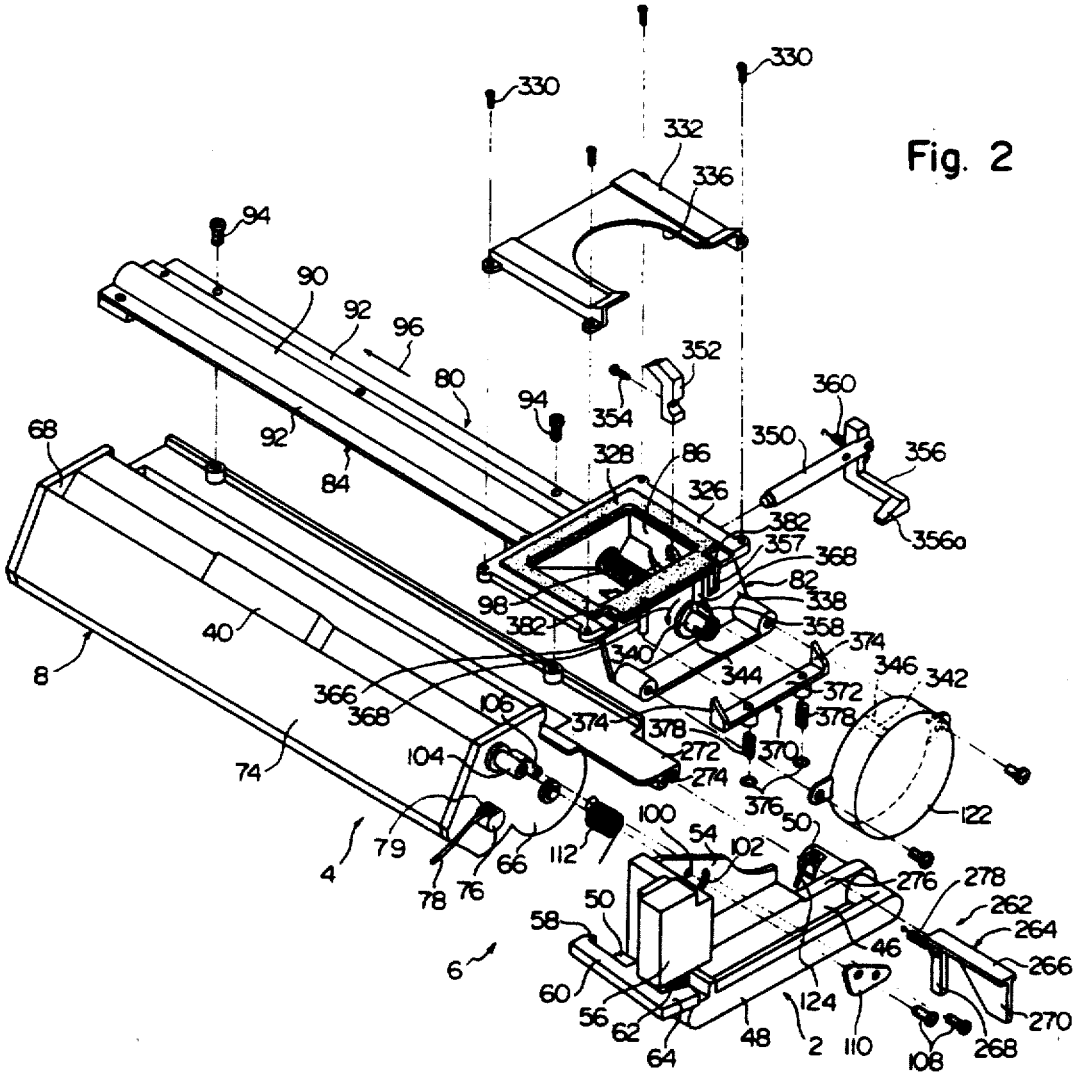
FIG. 2 is a perspective view, partly exploded, showing a main body of the developing device shown in FIG. 1.
Figure 4:
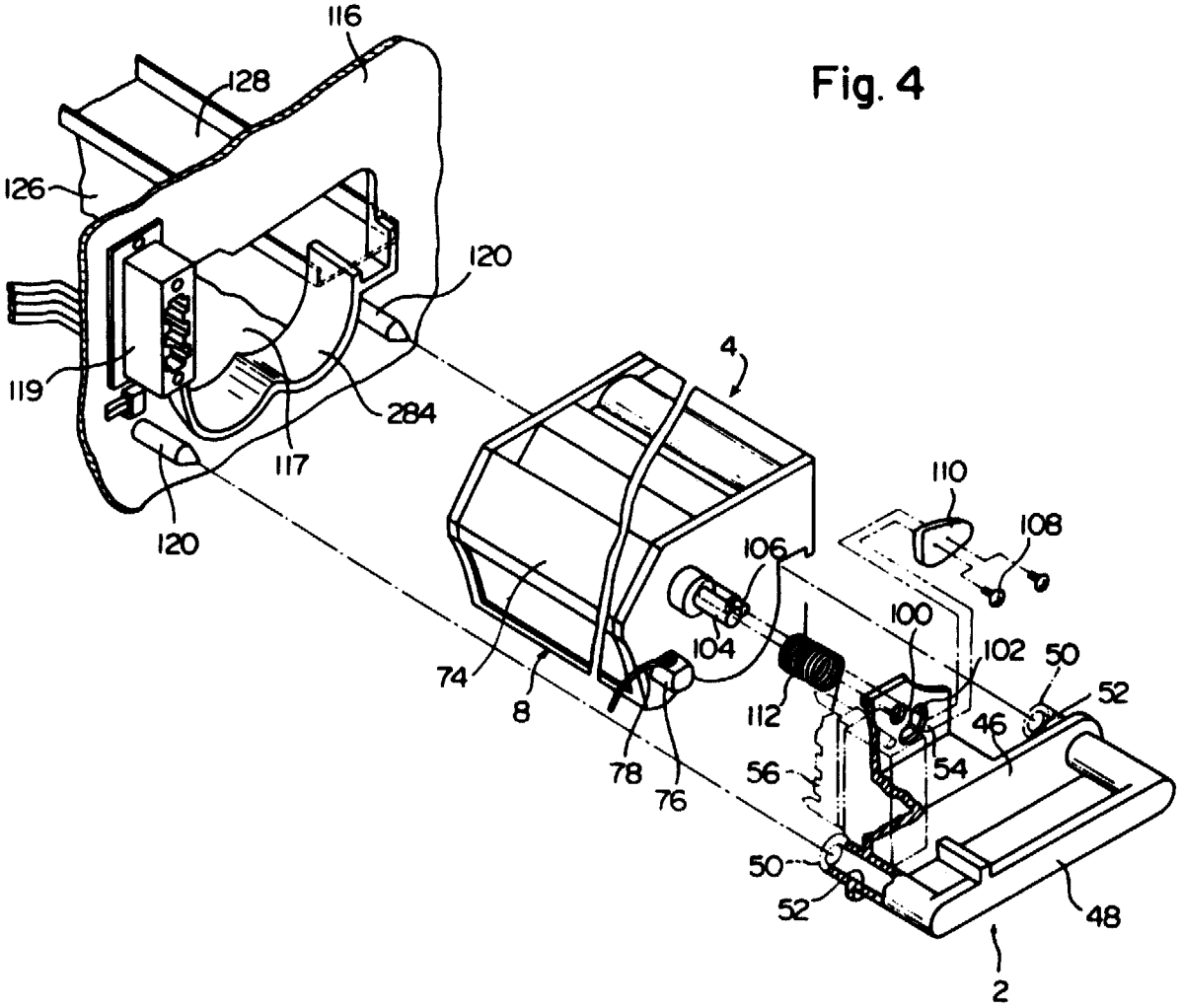
FIG. 4 is a perspective view showing the principal parts of the main body of the developing device shown in FIG. 2 and part of the image-forming machine on which the main body of the developing device is to be mounted.

The illustrated developing device comprises a main body or unit 6 including a supporting section 2 and a developing section 4 extending from the supporting section 2 (see FIGS. 2 and 4 also). The main body 6 of the developing device is detachably mounted on an image-forming machine such as an electrostatic copying machine. In the so-mounted state, the developing section 4 of the main body 6 is free to pivot *in a turnable manner* between a non-operating position shown by [sold] *solid* lines in FIG. 1 and an operating position shown by two-dot chain lines in FIG. 1.

The developing section 4 is provided with a development housing 8 defining a developing chamber 10. An opening 11 is formed in the left surface of the development housing 8 as viewed in FIG. 1 (that surface which faces a photosensitive material to be described). A magnetic brush mechanism 12 constituting applicator means is disposed in the left part of the developing chamber 10, and agitating means 14 is disposed in the right part of the developing chamber 10. The magnetic brush mechanism 12 is comprised of a combination of a hollow sleeve member 18 to be rotated in the direction shown by an arrow 16 and a stationary permanent magnet 20 disposed with the sleeve member 18, and a developer is held on the peripheral surface of the hollow sleeve member 18 and carried in the direction of arrow 16. The agitating means 14 comprises a supporting shaft 22 and an agitating member 24 mounted on the supporting shaft 22, and outwardly projecting vanes 26 are provided on the peripheral surface of the agitating member 24. The agitating means 14 is rotated in the direction shown by an arrow 28 to agitate and mix the developer in the developing chamber 10 and triboelectrically charge the toner in the developer. A guide member 30 is provided above the hollow sleeve member 18 and the agitating member 24. A toner transfer chamber 32 is defined in the upper part of the developing chamber 10 (in other words, above the guide member 30), and toner transfer means 34 is disposed in the toner transfer chamber 32. A toner supply opening 36 is formed in the bottom of the toner transfer chamber 32.

In the developing device of the above structure, the toner supplied from a toner cartridge (to be described hereinafter) is transferred in a direction perpendicular to the sheet surface in FIG. 1 by the action of the toner transfer means 34. The transferred toner is supplied onto the guide member 30 through the toner supply opening 36, and allowed to flow down onto the agitating member 24 along the upper surface of the guide member 30. The agitating member 24 mixes the developer flowing down from the guide member 30 (containing the fresh toner supplied as stated above) and the developer present in the developing chamber 10, and feeds the mixture to the magnetic brush mechanism 12. The magnetic brush mechanism 12 magnetically holds the resulting mixed developer onto the peripheral surface of the hollow sleeve member 18 and transfers it in the direction of arrow 16. On the other hand, a brush length adjusting portion 38 projecting toward the peripheral surface of the sleeve member 18 is provided as a one-piece unit with part of the development housing 8. Hence, the excess of the developer held on the hollow sleeve member 18 is removed therefrom by the action of the brush length adjusting portion 38. The removed developer is conducted upwardly and the allowed to flow down toward the agitating member 24 over the upper surface of the guide member 30. A toner concentration detector 40 is disposed in proximity to the brush length adjusting portion 38. The toner concentration detector 40 detects the toner concentration of the developer which has been removed from the hollow sleeve member 18 and conducted upwardly. The developer whose brush length has been adjusted by the action of the brush length adjusting portion 38 is further transferred in the direction of arrow 16 by the rotation of the hollow sleeve member 18 and acts on the surface of image-bearing means such as a rotating drum 42 having a photosensitive material disposed on its peripheral surface. A latent electrostatic image is formed on the surface of the photosensitive material on the rotating drum 42 by means known per se. Hence, when the developer held by the magnetic brush mechanism 12 acts on the surface of the photosensitive material on the rotating drum 42 in a developing zone shown at 44, the latent electrostatic image is developed to a toner image.

STRUCTURE OF THE MAIN BODY OF THE DEVELOPING DEVICE

Figure 5:
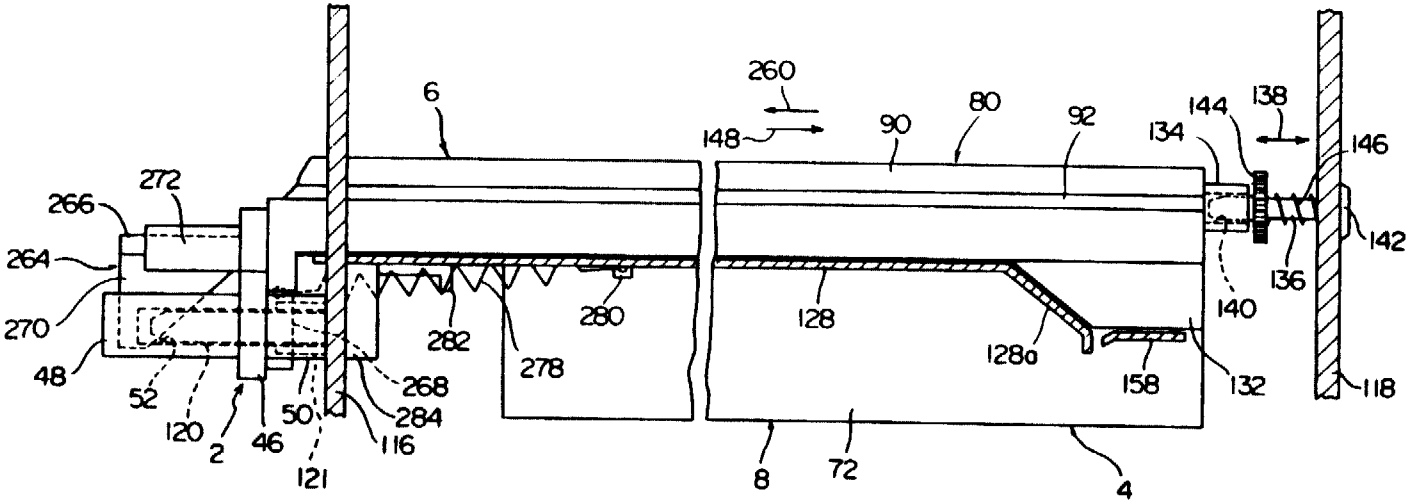
FIG. 5 is a side view showing, partly in section, the main body of the developing device shown in FIG. 2 as it detachably mounted on the main body of the image-forming device.

With reference to FIGS. 2, 4 and 5, the structure of the main body 6 of the developing device will be described. In the illustrated main body 6 of the developing device, the supporting section 2 exists st one end portion (the right bottom portion in FIGS. 2 and 4, and the left end portion in FIG. 5), and the developing section 4 extends from the supporting section 2 to the other end portion (to the left top in FIG. 2, and to the right in FIG. [4] *5*).

The supporting section 2 has a supporting main body 46, and a gripping member 48 is provided as a one-piece unit with the front surface of the supporting main body 46. A pair of protruding portions 50 spaced from each other in the left-right direction are provided in the rear surface of the supporting main body 46, and a cylindrical recessed received portion 52 (FIGS. 4 and 5) is defined in each protruding portion 50. The supporting main body 46 has extending substantially perpendicularly and upwardly therefrom a supporting wall 54. A connecting terminal 56 constituting electrical connecting means is mounted on the supporting wall 54. An engaging member 60 having a claw portion 58 is pivotably mounted on the supporting main body 46, and a biasing spring 62 is attached to the engaging member 60. By depressing an operating portion 64 of the engaging member 60, the engaging member 60 can be pivoted against the biasing force of the biasing spring 62.

The development housing 8 of the developing section 4 has a pair of end walls 66 and 68 spaced from each other in the width direction of the housing 8, i.e. the front-rear direction of the image-forming machine (a direction perpendicular to the sheet surface in FIG. 1, a direction from right bottom to left top in FIG. 2, and the left-right direction in FIG. 5) and a bottom wall 70, a side wall 72 and an upper wall 74 (FIG. 1) disposed between the end walls 66 and 68, and these walls 66, 68, [79] *70*, 72 and 74 define the developing chamber 10. It will be understood from FIGS. 1 and 2 that in the illustrated embodiment, shaft portions (not shown) provided at opposite end portions of the hollow sleeve member 18 in the magnetic brush mechanism 12 are supported rotatably on the end walls 66 and 68, and supported on the end wall 66 via a supporting member 76 mounted on the end wall 66. In the illustrated embodiment, one end of a wire 78 for applying a development bias voltage to the hollow sleeve member 18 is connected to the supporting member 76 by means of a screw member 79. The other end of the wire 78 is connected to the connecting terminal 56 of the supporting section 2. The supporting shaft 22 of the agitating means 14 is also rotatably supported on the end walls 66 and 68.

With reference mainly to FIG. 2, in the illustrated embodiment, an auxiliary housing 80 is mounted on the upper wall 74 of the development housing 8, and the auxiliary housing 80 is provided with a cartridge loading portion 82 and a toner transfer portion 84. The cartridge loading portion 82 defines a toner discharge chamber 86, and its upper surface is opened. On the other hand, a toner cartridge 88 (FIG. 11) is detachably loaded above the toner discharge chamber 86, and the toner in the toner cartridge 88 is discharged into the toner discharge chamber 86. The toner cartridge 88 and the cartridge loading portion 82 will be described hereinafter in detail. The toner transfer portion 84 is constructed of a hollow [cylinsdrical] *cylindrical* wall 90 and extends from the cartridge mounting portion 82 to the left top as viewed in FIG. 2. A pair of protrusions 92 are provided opposite to the peripheral surface of the cylindrical wall 90, and the auxiliary housing 80 is mounted in position on the development housing 8 by securing the protrusions 92 to the upper wall 74 of the housing 8 by screws 94. The toner transfer chamber 32 defined by the cylindrical wall 90 is allowed to communicate with the toner discharge chamber 86, and the toner supply opening 36 formed at the bottom of [will] *wall* 90 has a progressively increasing width in the toner transfer direction shown by an arrow 96. A helical member 98 constituting the toner transfer means 34 is rotatably mounted in the toner transfer chamber 32. One end portion of the helical member 98 extends from the toner transfer chamber 32 to the toner discharge chamber 86, and its other end portion extends to the left top as viewed in FIG. 2 in the developing chamber 10. Accordingly. the toner discharged into the toner discharge chamber 86 from the toner cartridge 88 (FIG. 11) is transferred in the direction of arrow 96 in the toner transfer chamber 32 by the action of the helical member 98. In the upstream portion of the toner transfer chamber 32 in the transfer direction shown by arrow 96, the width of the toner supply opening 36 is relatively small. Thus, in spite of the relatively large amount of the toner transferred, the proportion of the toner supplied through the toner supply opening 36 is relatively small. Since the width of the toner supply opening 36 is relatively large in the downstream portion of the toner transfer chamber 32 in the transfer direction shown by arrow 96, the proportion of toner supplied through the toner supply opening 36 is relatively large in spite of the relatively small amount of the toner transferred. Hence, the toner from the toner discharge chamber 86 is supplied substantially uniformly over the entire width direction of the developing chamber 10 through the toner supply opening 36.

The support section 2 and the developing section 4 are connected as described below. Mainly with reference to FIGS. 2 and 4, a circular hole 100 and an arcuate guide hole 102 are formed in the supporting wall 54 in the supporting section 2. On the other hand, in the developing section 4, a supportion shaft portion 104 and a guide shaft portion 106 to be guided are provided on the outside of the end wall 66. The developing section 4 is attached to the supporting section 2 by inserting the supporting shaft portion 104 into the hole 100 and the guide shaft portion 106 into the guide hole 102. In the illustrated embodiment, the supporting shaft portion 104 and the guide shaft portion 106 slightly project through the supporting wall 54 of the supporting section 2, and a linking plate piece 110 is attached to the end surfaces of the supporting shaft portion 104 and the guide shaft portion 106 by screws 108. By the action of the linking plate piece 110, detachment of the developing section 4 from the supporting section 2 is surely prevented. a biasing coil spring 112 (constituting biasing means) is fitted over the supporting shaft portion 104. One end portion of the biasing coil spring 112 is anchored at part of the supporting wall 54, and the other end portion is anchored at the guide shaft portion 106. The biasing coil spring 112 elastically biases the developing section 4 in the direction shown by an arrow 114 (see FIG. 1) toward the operating position shown by the two-dot chain lines in FIG. 1.

STRUCTURE OF THE MAIN BODY OF AN IMAGE-FORMING MACHINE

Figure 3:
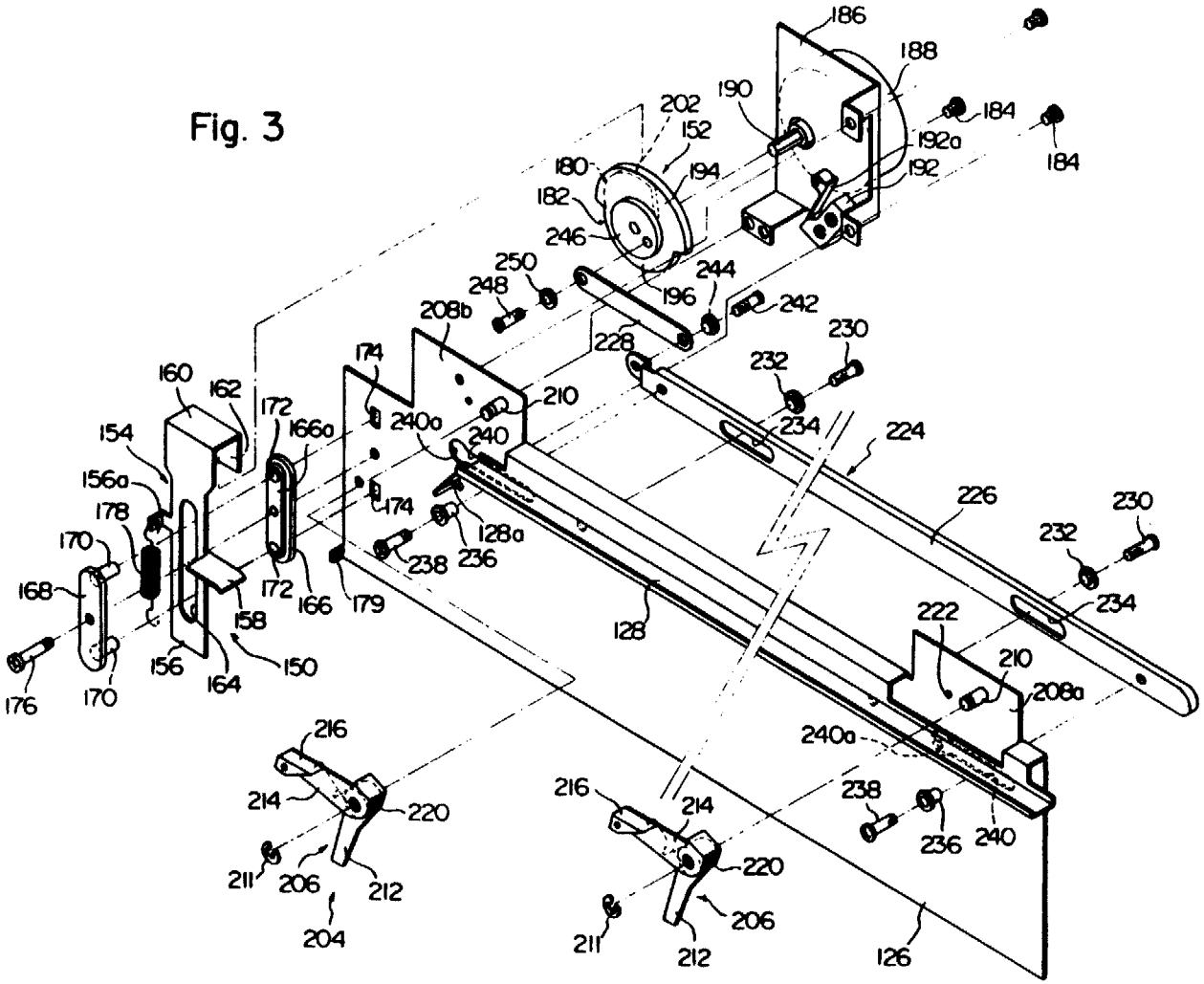
FIG. 3 is an exploded perspective view showing the construction of an image-forming machine on which the main body shown in FIG. 2 is to be detachably mounted.

With reference to FIGS. 3 to 5, the structure of the main body or frame of an image-forming machine on which is to be mounted detachably the main body 6 of the developing device will be described.

The main body of the image-forming machine such as the main body of an electrostatic copying machine has a front base plate 116 and a rear base plate 118 (FIG. 5) spaced from each other in the front-rear direction (the left-right direction in FIG. 5). An opening 117 (FIG. 4) having a shape nearly corresponding to the shape of the developing section 4 of the developing device 6 is formed in the front base plate 116, and the developing section 4 is positioned in the required manner between the front base plate 116 and the rear base plate 118 as shown in FIG. 5 through the opening 117. In the illustrated embodiment shown in FIG. 4, a plate-like supporting guide member 284 having a shape corresponding to the shape of the lower portion of the developing section 4 is provided at a site which defines the lower edge of the opening 117. As shown in FIG. 4, one end portion of the supporting guide member 284 projects slightly ourwardly from the base plate 116, and its other end portion projects slightly inwardly from the front base plate 116. The supporting guide member 284 has a predetermined width in the front-rear direction (see FIGS. 9-A and 9-B). The supporting guide member 284 guides and supports the developing section 4 at the time of mounting and detaching the main body 6 of the developing device. From the front surface (outside surface) of the front base plate 116 extend a pair of supporting pins 120 (FIG. 4) spaced from each other in the left-right direction. The pair of supporting pins 120 are disposed corresponding to the pair of recessed receiving portions 52 defined in the supporting section 2. A connecting terminal 119 (constituting electrical connecting means) corresponding to the connecting terminal 56 of the supporting section 2 is provided in the front surface of the front base plate 116. Hence, when the main body 6 of the developing device is detachably mounted on the main body of the image-forming machine as shown in FIG. 5, the supporting pins 120 in the front base plate 116 are received in the recessed receiving portions 52 of the supporting section 2. As a result, the supporting section 2 is mounted on the front base plate 116, and the connecting terminal 56 of the supporting section 2 is electrically connected to the connecting terminal 119 of the front base plate 116. Thus, the hollow sleeve member 18 and the toner concentration detector 40 are connected to a bias power supply and control means (neither of which are shown) provided in the main body of the image-forming machine via the connecting terminals 56 and 119. The connecting terminal 56 may be of a convex shape, for example, and the other connecting terminal 119 may be of a concave shape conforming to the convex shape.

In the illustrated embodiment, a sleeve 121 (FIG. 5) made of a metalic material is fitted in the inside of one protruding portion 50 (the one on the right top in FIGS. 2 and 4). The front base plate 116 and the supporting pins 120 are also formed of a metallic material. A grounding wire 124 of an electric motor 122 is fixed to the above one protruding portion 50 in order to rotate the helical member 98, and is connected to a sleeve member 121 via a fixing screw. Hence, when the main body 6 of the developing device is mounted in the required manner, the grounding wire 124 of the electric motor 122 is ground to the front base plate 116 via the fixing screw, the sleeve member [112] *121* and the supporting pin 120.

With reference mainly to FIG. 3, a supporting plate 126 extending in the front-rear direction is disposed between the front base plate 116 and the rear base plate 118. An upwardly opened channel-like guide portion 128 is provided in the upper end portion of the supporting plate 126, and extends in a straight line from one end of the supporting plate 126 toward its rear end portion. In the illustrated embodiment, a greater portion of the guide portion 128 extends substantially horizontally, and only its other end portion 128a is inclined downwardly toward the other end (the right end in FIG. 5). On the other hand, the upper part of the right end (in FIG. 1) of the development housing 8 has provided therein a rightwardly projecting protruding portion 130 to be supported, and a downwardly projecting piece 132 is formed integrally with the under surface of the protruding portion 130. Furthermore, as shown in FIG. 5, a protruding portion 134 is formed in the outside surface of the end wall 68 of the developing section 4, and a shaft member 136 is mounted on the rear base plate 118. A recessed receiving portion 140 extending to the left in FIG. 5 is defined in the end surface of the protruding portion 134. On the other hand, a fixing portion 142 is provided in one end portion of the shaft member 136, and the other end portion of the shaft member 136 projects inwardly through the rear base plate 118. A gear 144 is attached to this projecting portion of the shaft member 136 so as to be movable in the front-rear direction shown by an arrow 138. The other end of the shaft member 136 projects inwardly from the gear 144. Between the gear 144 and the rear base plate 118 is interposed a biasing spring member 146 for elastically biasing the gear 144 inwardly (i.e. forwardly). The gear 144 is drivingly connected to a driving source for the image-forming machine (not shown in the drawings). In mounting the main body 6 of the developing device on the main body of the image-forming machine, the protruding piece 132 provided in the development housing 8 is guided by the guide portion 128 of the supporting plate 126 and moved in the mounting direction shown by an arrow 148. When the main body 6 of the development device is mounted in the required manner, the projecting end portion of the shaft member 136 is positioned in the recessed receiving portion 140 of the protruding portion 134 provided in the end wall 68 of the developing section 4. Hence, in such mounted state, one end portion of the developing section 4 is rotatably supported by the supporting portion 2 via the supporting shaft portion 104, and the other end portion of the developing section 4 is rotatably supported on the rear base plate 118 via the shaft member 136. The developing section 4 is thus free to rotate between the aforesaid non-operating and operating positions about the supporting shaft portion 104 and the shaft member 136 as a center (more specifically about a central axis of the supporting shaft portion 104 and the shaft member 136 which constitutes a rotating central axis extending in the widthwise direction of the main body 6 of the developing device). When the main body 6 of the developing device is so mounted, a gear for rotating the hollow sleeve member 18 of the magnetic brush mechanism 12 and a gear for rotating the supporting shaft 24 of the agitating means 14 are drivingly connected to the gear 144, although such gears are not shown in the drawings.

Changeover mechanism

Figure 6:
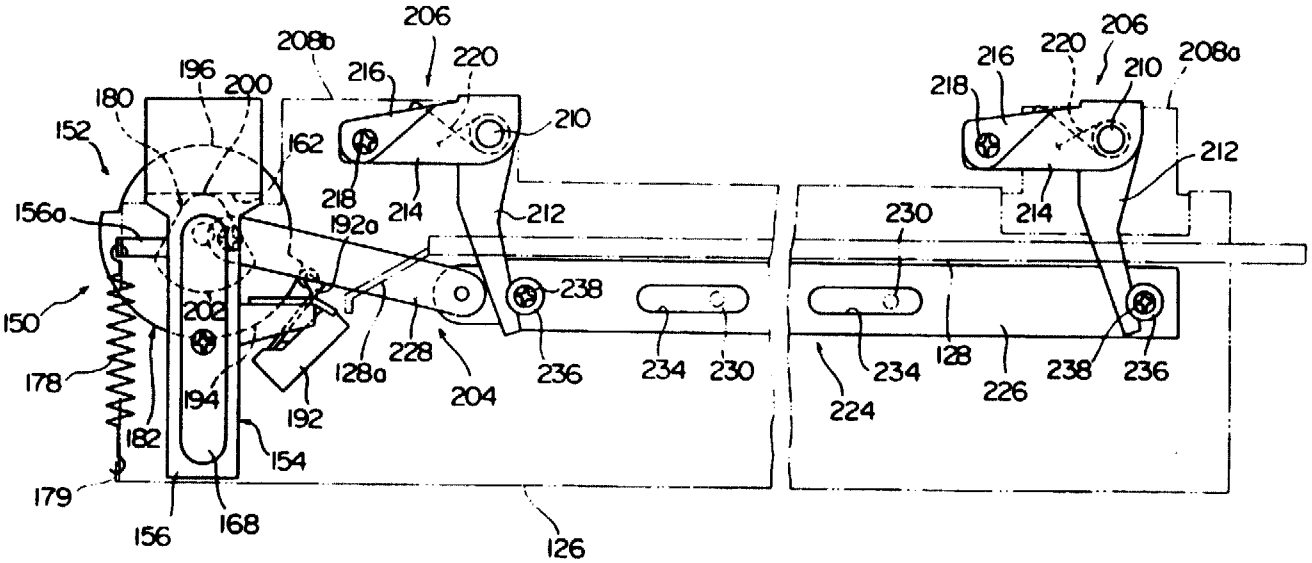
FIG. 6 is a front view showing a changeover mechanism and positioning means in the developing device shown in FIG. 1.

In the illustrated embodiment, a changeover mechanism 150 is provided which selectively brings the developing section 4 to the non-operating position shown by the solid lines in FIG. 1 and the operating position shown by the two-dot chain lines in FIG. 1 when the main body 6 of the developing device is set on the main body of the image-forming machine. With reference to FIG. 6 as well as FIG. 3, the illustrated changeover mechanism 150 is provided with cam means 152 and an elevating-lowering member 154 adapted to be elevated or lowered by the action of the cam means 152. The elevating-lowering member 154 has a main body portion 156, an acting portion 158 provided at an intermediate portion in the main body portion 156, a bent portion 160 at the upper end of the main body portion 156, and a cam follower portion 162 extending downwardly from the bent portion 160. A vertically extending elongate hole 164 is formed in the main body portion 156. The elevating-lowering member 154 is mounted vertically movably on the other end portion of the supporting frame 126 in the manner mentioned below. A guide member 166 is disposed in the hole 164 of the main body portion 156 of the elevating-lowering member 154 (more specifically, a guide projecting portion 166a of the guide member 166 is positioned in the hole 164). On the other hand, mounting pins 170 spaced from each other in the vertical direction are provided in a mounting member 168. By inserting the mounting pins 170 into openings 174 provided in the supporting plate 126 through holes 172 formed in the guide member 166, the elevating-lowering member 154 is mounted on the guide member 166 attached to the supporting plate 126. In the illustrated embodiment, a fixing screw 176 is threadedly secured to the supporting plate 126 through the mounting member 168 and the guide member 166. Hence, the elevating-lowering member 154 is free to move between an elevated position (the position shown in FIG. 7-B) at which the lower end of the hole 164 abuts against the lower end of the guide protruding portion 166a and a lowered position (the position shown in FIGS. 6 and 7-A) at which the upper end of the hole 164 abuts against the upper end of the the guide protruding portion 166a). The acting portion 158 of the elevating-lowering member 154 is constructed such that it can act on the protruding portion 132 provided on the development housing 8. A [baising] *biasing* spring 178 is also attached to the elevating-lowering member 154. One end portion of the biasing spring 178 is engaged with an engaging protruding piece 156a provided on the main body portion 156 of the elevating-lowering member 154 and its other end portion is engaged with an engaging piece 179 provided on the lower end portion of the supporting plate 126. The biasing spring 178 elastically biases the elevating-lowering member 154 downwardly toward the aforesaid lowered position.

The illustrated cam means 152 is provided with a fan-like first cam 180 and a circular second cam 182. In the illustrated embodiment, an auxiliary plate is secured to the rear end portion of the upper part of the supporting plate 126 by means of a fixing screw 184. An electric motor 188 is mounted on the auxiliary plate 186, and the first cam 180 and the second cam 182 are mounted on an output shaft 190 which projects from the electric motor 188 through the auxiliary plate 186. The first cam 180 and the second cam 182 are formed as a one-piece unit. The first cam 180 is disposed so that its peripheral surface acts on the lower edge of the cam follower portion 162 of the elevating-lowering member 154, and the second cam 182 is disposed so as to be positioned between the main body portion 156 and the cam follower portion 162 of the elevating-lowering member 154. Switch means 192 such as a microswitch is attached to the auxiliary plate 186. The switch means 192 has a detecting arm 192a, and is adapted to be on when a large-diameter portion 194 of the second cam 182 acts on the detecting arm 192a and to be off when a small-diameter portion 196 of the second cam 182 acts on the detecting arm 192a (or does not substantially act on the detecting arm 192a).

When a changeover switch (not shown) provided in an operating panel in the image-forming machine is operated in order to set the developing section 4 in operation, the electric motor 188 is rotated in the direction shown by an arrow 198 (FIGS. 7-A and 7B), and with it, the first cam 180 and the second cam 182 are rotated. When by this rotation, the large-diameter portion 194 of the second cam 182 acts on the detecting arm 192a of the switch means 192, the electric motor 188 is denergized on the basis of a detection signal from the switch means 192, and the elevating-lowering member 154 and elements relating to it are held in the state shown in FIGS. 6 and 7-A. In the state shown in FIG. 7-A, the first cam 180 is held at a second angular position displaced substantially by an angle of 180 degrees from a first angular position. At the second angular position, a small-diameter portion 200 of the first cam 180 acts on the lower edge of the cam follower portion 162 of the elevating-lowering member 154 and the elevating-lowering member 154 is moved to the lowered position by the action of the biasing spring 178. It will be easily understood by comparing FIG. 7-A with FIG. 7-B that at the lowered position, the developing section 4 is permitted to rotate in the direction shown by an arrow 114 (FIG. 1) with respect to the supporting section 2, and the developing section 4 is brought to the operating position shown by the two-dot chain lines in FIG. 1 by its own weight and by the biasing coil spring 112 attached to the developing section 4. In the operating position, part of the development housing 8 abuts against supporting means (not shown) supporting the rotating drum 42, and therefore, the turning of the developing section 4 beyond the operating position is exactly hampered by the action of the supporting means. When the developing section 4 is thus held at the operating position, the magnetic brush mechanism 12 is positioned in proximity to the peripheral surface of the rotating drum 42 and the developer held on the hollow sleeve member 18 acts on the surface of the photosensitive material on the rotating drum 42 in the developing zone 44. As a result, a latent electrostatic image formed on the surface of the photosensitive material is developed to a toner image. As shown in FIG. 7-A, when the elevating-lowering member 154 is held at the lowered position, the action portion 158 abuts [aginst] *against*, or is spaced downwardly from, the under surface of the protruding piece 132 of the development housing 8. Therefore, the acting portion 158 does not substantially act on the protruding piece 132. On the other hand, when the changeover switch (not shown) provided in the operating panel is operated in order to set the developing section 4 out of operation, the electric motor 188 is rotated in the direction of arrow 198, and with it, the first cam 180 and the second cam 182 are rotated. When by this rotation the small-diameter portion 196 of the second cam 182 acts on the detecting arm 192a of the switch means 192, the electric motor 188 is deenergized on the basis of a detection signal from the switch means 192, and the elevating-lowering member 154 and elements relating to it are held in the state shown in FIG. 7-B. In the state shown in FIG. 7-B, the first cam 180 is held at the first angular position by being substantially moved away from the second angular position. Since at the first angular position, the large-diameter portion 202 of the first cam 180 acts on the lower edge of the cam follower portion 162 of the elevating-lowering member 154, the elevating-lowering member 154 is held at the elevated position against the action of the biasing spring 178. At the elevated position, the acting portion 158 of the elevating-lowering member 154 acts on the protruding piece 132 of the development housing 8 to elevate it as shown in FIGS. 1 and 7-B. Consequently, the developing section 4 is turned in a direction opposite to the direction of arrow 114 and is brought to the non-operating position shown by solid lines in FIG. 1. At the non-operating position, the magnetic brush mechanism 12 is positioned apart from the peripheral surface of the rotating drum 42, and the developer held on the hollow sleeve member 18 does not substantially act on the surface of the photosensitive material on the rotating drum 42.

POSITIONING MEANS

[the] *The* illustrated developing device is provided with positioning means for holding the developer section 4 of its main body 6 exactly at the aforesaid operating position. With reference to FIGS. 3 and 6, the illustrated positioning means 204 is equipped with a pair of pressing members 206 spaced from each other in the widthwise direction of the main body 6 of the developing device (the direction from right bottom to left top in FIG. 3, and the left-right direction in FIG. 6). In the illustrated embodiment, an upwardly extending projecting portion 208a is provided at one end portion of the supporting plate 126, and one pressing member 206 is pivotably mounted on a pin 210 implanted in the projecting portion 208a. An upwardly extending projecting portion 208b is provided at the other end portion of the supporting plate 126, and the other pressing member 206 is pivotably mounted on a pin 210 implanted in the projecting portion 208b. An engaging member 211 for preventing detachment of the pressing member 206 is attached to the end of each pin 210. Each of the pressing members 206 has a substantially inverted L-shape, including a downwardly extending arm portion 212 and a pressing arm portion 214 extending to the left as shown in FIGS. 3 and 6. A nearly triangular pressing block piece 216 is attached to the free end of the pressing arm portion 214 by means of a fixing screw 218. Each of the pressing members 206 is free to pivot between a first position shown in FIGS. 6 and 7-A and a second position shown in FIG. 7-B. A biasing coil spring 220 constituting elastic biasing means is attached to each of the pressing members 206. The biasing coil spring 220 is fitted over the pin 210 and has one end portion engaged with a hole 222 (FIG. 3) formed in the supporting plate 126. The other end portion of spring 220 is engaged with the pressing arm portion 214 of the pressing member 206. Thus, the biasing coil spring 220 elastically biases each pressing member 206 toward the aforesaid first position, namely counterclockwise with respect to FIGS. 3 and 6.

The illustrated positioning means 204 is further equipped with a moving member 224 for pivoting the pressing members 206. The moving member 224 has a relatively long first member 226 and a relatively short second member 228, and the first member 226 is mounted on the supporting plate 126 so that it can move in the widthwise direction of the main body 6 of the developing device. In the illustrated embodiment, a pair of supporting screws 230 spaced from each other in the widthwise direction of the main body 6 of the developing device are threadedly secured to the supporting plate 126, and a sleeve member 232 is rotatably mounted on each of the supporting screws 230. On the other hand, a pair of elongate holes 234 are formed in the opposite end portions of the first member 226 corresponding to the pair of supporting screws 230. By positioning the sleeve members 232 in the elongate holes 234, the first member 226 is mounted on the supporting plate 126. Hence, as shown in FIGS. 7-A and 7-B, the first member 226 is free to move between a position at which each supporting screw 230 is positioned at one end portion of each elongate hole 234 and a position at which each supporting screw 230 is positioned at the other end portion of each elongate hole 234. Acting sleeve members 236 are mounted on the opposite end portions of the first member 226 corresponding to the pressing members 206. In the illustrated embodiment, supporting screws 238 are threadedly secured to both end portions of the first member 226, and the acting sleeve members 236 are [rottably] *rotatably* mounted on the supporting screws 238. Hence, by the abutment of the arm portions 212 of the pressing members 206 against the acting sleeve members 236, the pressing members 206 are surely prevented from turning counterclockwise as viewed in FIGS. 6, 7-A and 7-B. To permit the aforesaid movement of the first member 226, long holes 240 for the acting sleeve members 236 are formed in the supporting plate 126. Furthermore, in order to permit mounting of the [fist] *first* member 226, a large-diameter portion [204a] *240a* permitting insertion of each acting sleeve member 236 is formed in one end of each long hole 240 in the supporting plate 126. The second member 228 is interposed between the cam means 152 and the first member 226. One end portion of the second member 228 is rotatably connected to the first member 226 via a connecting screw 242 threadedly secured to the left end of the first member 226 as shown in FIGS. 3 and 6 and a sleeve member 244 attached to the connecting screw 242. A disc-like portion 246 is integrally formed in the second cam 182, and the other end portion of the second member 228 is rotatably connected to the second cam 182 via a connecting screw 248 threadedly secured to the disc-like portion 246 in eccentric relationship, and a sleeve member 250 attached to the connecting screw 248.

In operation, the positioning means 204 is held in an operating state shown in FIG. 7-A when the first cam 180 is at the second angular position. Specifically, the connecting screw 248 secured to the second cam 182 is positioned in proximity to the first member 226 and therefore, the first member 226 is moved in the direction shown by an arrow 252 (FIG. 7-A) via the second member 228 and held at the position shown in FIG. 7-A (the position at which each supporting screw 230 is positioned at one end portion of the respective long hole 234 of the first member 226). As a result, with the movement of the first member 226, the supporting screws 238 are also moved to permit pivoting of the pressing members 206 in the direction shown by arrows 254 (FIG. 7-A). The pressing members 206 are pivoted in the direction of arrows 254 by the action of the biasing coil springs 220. Consequently, as shown in FIG. 7-A, the pressing block piece 216 provided on the pressing arm portion 214 of each pressing member 206 acts on the upper surface of the right end portion of the developing section 4 as viewed in FIG. 1 (more specifically the upper surface of one protrusion 92, the right protrusion in FIG. 1 and 2) provided in the auxiliary housing 80). As a result, the developing section 4 is turned in the direction of arrow 114 (FIG. 1) by its one weight and by the biasing force of the biasing coil spring 112 and is surely held at the operating position. Since in this operating state of the positioning means 204 each of the pressing members 206 is elastically biased in the direction of arrow 254 (FIG. 7-A) by the action of the biasing coil spring 220, the developing section 4 is elastically held exactly at the operating position by the action of the biasing coil springs 220 and the pressing members 206 (and therefore, the pressing members 206 are held elastically at the first position). On the other hand, when the first cam 180 is at the first angular position, the positioning means 204 is held in [anon-operating] *a non-operating* state shown in FIG. 7-B. Specifically, the connecting screw 248 secured to the second cam 182 is moved away from the first member 226, and therefore, the first member 226 is moved in the direction of arrow 256 (FIG. 7-B) via the second [memeber] *member* 228 and is held at the position shown in FIG. 7-B (the position at which each supporting screw 230 is held at the other end portion of the respective long hole 234 of the first member 226). As a result, the supporting screws 238 are moved with the movement of the first member 226, and the supporting screws 230 act on the arm portions 212 of the pressing members 206 via the acting sleeve members 236 to pivot the arm portions 212 in the direction shown by arrows 258 (FIG. 7-B). Thus, the pressing members 206 are held at the second position shown in FIG. 7-B. Thus, since the first cam 180 is at the first angular position, the developing section 4 is held at non-operating position. Furthermore, since the pressing members 206 are held at the second position, the pressing block pieces 216 abut against, or are positioned slightly upwardly from, the developing section 4. Hence, the pressing members 206 do not substantially act on the developing section 4, and the developing section 4 is exactly held at the non-operating position by the action of the elavating-lowering member 154.

In relation to the positioning means 204, for easy elevating of the elevating-lowering member 154 the above embodiment is preferably [constracted] *constructed* such that the elevating-lowering member 154 is elevated by the first cam 180 after the pressing by the pressing members 206 is cancelled by moving the first member 226 in the direction of arrow 256.

The above developing device has the following features in relation to the positioning means 204.

With reference to FIGS. 8-A to 8-C in conjunction with FIGS. 7-A and 7-B, when the elevating-lowering member 154 is at the elevated position, the acting portion 158 of the elevating-lowering member 154 is substantially at the same level as the guide portion 128 provided in the supporting plate 126 (see FIGS. 7-B and 8-A). Hence, when the elevating-lowering member 154 is held at the elevated position at the time of detaching the main body 6 of the developing device from the main body of the image-forming machine, the developing section 4 is held at the non-operating position. Consequently, the pressing members 206 of the positioning means 204 are held at the second position. Accordingly, the main body 6 of the developing device can be detached from the main body of the image-forming machine by moving it in the detaching direction shown by arrow 260 (FIG. 5e. At the time of detaching, the protruding piece 132 provided in the development housing 8 is moved while being guided by the guide portion 128 of the supporting plate 126 and the acting portion 158 of the elevating-lowering member 154 being at the elevated position. The developing section 4 is therefore kept at the non-operating position during detachment, and the developer held by the magnetic brush mechanism 12 does not substantially act on the surface of the photosensitive material on the rotating drum 42. Damage of the photosensitive material during detachment can therefore be prevented. At the same time, scattering of the developer which occurs upon its acting on the photosensitive material can be surely prevented. Furthermore, the pressing members 206 are held at the second position and do not substantially act on the developing section 4. Moreover, since the acting portion 158 and the guide portion 128 are maintained at the same level, the main body 6 of the developing device can be easily moved in the detaching direction shown by arrow 260. For the detachment of the main body 6 of the developing device in the aforesaid state, see FIGS. 9-A and 9-B also.

When the elevating-lowering member 154 is held at the lowered position, the acting portion 158 of the elevating-lowering member 154 is substantially at the same level as the lower end of the other end portion 128a of the guide portion 128 provided on the supporting plate 126 (see FIGS. 7-A, 8-B and 8-C). The developing section is surely held at the operating position as a result of the positioning means 204 being held in the operating state. In the illustrated embodiment, when the positioning means 204 is in the operating state, the pressing members 206 are biased toward the first position by the biasing coil springs 220, but can be pivoted to the second position against the biasing action of the biasing coil springs 220. In this connection, the main body 6 of the developing device can be detached from the main body of the image-forming machine even when the elevating-lowering member 154 is at the lowered position. With reference to FIG. 8-B, when the main body 6 of the developing device is moved in the detaching direction of arrow 260 while the elevating-lowering member 154 is at the lowered position and the developing section 4 is at the operating position, the protruding piece 132 provided on the development housing 8 first moves in an inclined upward direction; by the guidance of the inclined surface of the other end portion 128a of the guide portion 128 on the supporting plate 126. Thereafter, the protruding piece 132 is guided by a substantially horizontal part of the guide portion 128 (FIG. 8-C). (Incidentally, that part of the protruding piece 132 which comes into contact with the other end portion 128a of the guide portion 128 is preferably inclined corresponding to the other end portion 128a in order to make the upward movement of the protruding piece 132 smooth.) When the main body 6 of the developing device is thus moved in the direction of arrow 260, the developing section 4 is turned from the operating position toward the non-operating position since the protruding piece 132 is moved upwardly. With this movement, the pressing members 206 are pivoted from the first position toward the second position in the direction of arrows 258. When as shown in FIG. 8-C, the protruding piece 132 is moved along the substantially horizontal part of the guide portion 128, the developing section 4 is held at the non-operating position and the pressing members 206 are held substantially at the second position. (Incidentally, when the main body 6 of the developing device is detached in the required manner, the pressing members 206 are brought to the first position shown by solid lines in FIG. 8-C by the returning force of the biasing coil springs 220). Accordingly, in relation to the fact that the pressing members 206 can be pivoted between the first and second positions even when the positioning means 204 is in the operating state, the main body 6 of the developing device can be detached in the required manner from the main body of the image-forming machine by moving it in the detaching direction shown by arrow 260. When the main body 6 of the developing device is moved in the detaching direction of arrow 260 while the developing section 4 is at the operating position, the developing section 4 is held at the non-operating position by the action of the inclined other end portion 128a of the guide portion 128 and the protruding piece 132 provided in the development housing 8. Thus, the developing section 4 is moved while being held at the non-operating position. In this case, too, the developer held on the magnetic brush mechanism 12 does not substantially act on the surface of the photosensitive material on the rotating drum 42, and damage of the photosensitive material during detachment can be surely prevented. In addition, scattering of the developer can be surely prevented. See FIGS. 10-A and 10-B also with regard to the detachment of the main body 6 of the developing device when the elevating-lowering member 154 is at the lowered position.

In the illustrated embodiment, as shown in FIG. 8-A, the protruding piece 132 in the development housing 8 is preferably constructed as to be substantially astride the substantially horizontal part of the guide portion 128 and the acting portion 158 of the elevating-lowering member 154. This arrangement permits easier mounting and detachment of the main body 6 of the developing device.

Non-operating position holding means

The illustrated developing device is further provided with means for holding the developing section 4 at the non-operating position. With reference mainly to FIGS. 2 and 5, the non-operating position holding means 262 has a holding member 264 movable in the mounting and detaching directions of the main body 6 of the developing device. The holding member 264 has a main body portion 266 extending in the mounting direction shown by the arrow 148 (FIG. 5), a suspending piece 268 provided in the right end portion as viewed in FIG. 5 of the main body portion 266 (the front end portion with respect to the mounting direction of arrow 148) and a turn hampering portion 270 provided in the left end portion as viewed in FIG. 5 of the main body portion 266 (the rear end portion with respect to the mounting direction of arrow 148). On the other hand, a guide groove 274 (FIG. 2) having a nearly T-shaped vertical sectional shape is provided in a protruding portion 272 extending outwardly from the end wall 66 of the development [housiong] *housing* 8. The main body portion 266 of the holding member 264 is fitted in the guide groove 274 so as to be free to move in the directions shown by arrows 148 and 260. In the illustrated embodiment, the suspending piece 268 and the turn hampering portion 270 of the holding member 264 project downwardly through a downwardly extending opening formed in the guide groove 274, as shown in FIG. 5.

The [truth] *turn* hampering portion 270 of the holding member 264 is constructed such that it engages part of the supporting section 2 when it is at an engaging position shown in FIGS. 9-A and 10-A. In the illustrated embodiment, the under surface of the turn hampering portion 270 defines a substantially horizontal hampering surface 270a, and the upper surface of part of the supporting main body 46 in the supporting section 2 defines a substantially horizontal engaging surface 276 adapted to cooperate with the hampering surface 270a. At the aforesaid engaging position, the hampering surface 270a of the turn hampering portion 270 comes into engagement with the engaging surface 276 of the supporting section 2. In the illustrated embodiment, biasing means is attached to the holding member 264. The biasing means is constructed of a biasing spring 278. Its one end portion is engaged with an engaging piece 280 provided in the development housing 8 and its other end portion is engaged with the suspending piece 268 of the holding member 264 (see FIGS. 9-A and 10-A). The biasing spring 278 biases the holding member 264 toward the above engaging position. In relation to the holding member 264, a hampering member 282 is provided in the development housing 8. The hampering member 282 abuts against the suspending piece 268 of the holding member 264 and surely hampers the movement of the holding member 264 beyond the engaging position.

The operation and effect of the non-operating position holding means 262 will now be described.

In the above developing device, the holding member 264 is usually held at the engaging position when main body 6 is detached from the image-forming machine. The suspending piece 268 of the holding member 264 abuts against the hampering member 282 provided in the development housing 8, and the hampering surface 270a of the turn hampering member 270 is kept in engagement with the engaging surface 276 defined in the supporting main body 46 of the supporting section 2. Hence, in spite of the biasing action of the biasing coil spring 278, turning of the developing section 4 in the direction of arrow 114 (FIG. 1) with respect to the supporting section 2 is surely hampered by the action of the hampering surface 270a and the engaging surface 276, and as can be seen from FIGS. 9-A, the developing section 4 is held at the non-operating position with respect to the supporting section 2.

When the main body 6 of the developing device in this condition is mounted detachably on the main body of the image-forming machine, the holding member 264 is disengaged as described below. As shown in FIGS. 9-A and 9-B which show the elevating-lowering member 154 at the elevated position and FIGS. 10-A and 10-B which show the elevating-lowered member 154 at the lowered position, when the main body 6 of the developing device is slightly inserted into the opening formed in the front base plate 116 and the protruding piece 132 provided in the development housing 8 is positioned in the guide portion 128 of the supporting plate 126 and moved in the mounting direction shown by arrow 148, the front end portions of the pair of supporting pins 120 provided on the front base plate 116 are received in the pair of recessed receiving portions 52 defined in the supporting section 2 as shown in FIGS. 9-A and 10-A at a point of time when a greater portion of the developing section has been inserted into the main body of the image-forming machine. At this point of time, it is preferred that the protruding piece 132 provided in the development housing 8 be positioned at a substantially horizontal extending part of the guide portion 128, and the holding member 264 be held at the engaging position. By this arrangement, the pair of supporting pins 120 can easily be inserted into the recessed receiving portions 52 of the supporting section 2. When the main body 6 of the developing device is further moved in the direction of arrow 148; the suspending piece 268 of the holding member 264 abuts against supporting guide member 284 provided in the opening formed in the front base plate 116 (FIGS. 10-A and 10-B). With the movement of the main body 6 in the direction of arrow 148, the holding member 264 thus is moved in the direction of arrow 260 relative to the developing section 4 against the biasing force of the biasing spring 278. As a result, the engagement between the hampering surface 270a of the holding member 264 and the engaging surface 276 of the supporting section 2 is cancelled, and the developing section 4 is permitted to turn toward the operating position. Preferably, even when the engagement between the hampering surface 270a and the engaging surface 276 is cancelled, the protruding piece 132 of the development housing 8 is positioned at the substantially horizontal part of the guide member 128 and by moving the main body 6 of the developing device slightly further in the direction of arrow 148, the lower end of the protruding piece 132 moves away from the substantially horizontal part of the guide portion 128. When the main body 6 of the developing device is further moved, the front end portion of the shaft member 136 mounted on the rear base plate 118 is received in the recessed receiving portion 140 formed in the protruding portion 134 provided in the end wall 68 of the development housing 8, and the main body 6 is detachably mounted on the main body of the image-forming machine. In this mounted position, one end portion of the main body 6 of the developing device is supported by the front base plate 116 as a result of the supporting pins 120 being positioned in the recessed receiving portions 52, and the other end portion of the main body 6 is supported by the rear base plate 118 as a result of the front end portion of the shaft member 136 being positioned within the recessed receiving portion 140. The protruding piece 132 in the development housing 8 is positioned above the acting portion 158 of the elevating-lowering member 154 substantially away from the substantially horizontal part of the guide portion 128. Furthermore, when the developing device is thus mounted, the claw portion 58 of the engaging member 60 mounted on the supporting section 2 engages part of the front base plate 116, and the movement of the main body 6 of the developing device in the detaching direction of arrow 260 is hampered. It will be easily appreciated by comparing FIGS. 9-A and 9-B with FIGS. 10-A and 10-B that the main body 6 of the developing device can be detachably mounted on the main body of the image-forming machine when the elevating-lowering member 154 is at the elevated position and the lowered position, but that when the main body 6 of the developing device is mounted while the elevating-lowering member 154 is at the elevated position, the developing section 4 is held at the non-operating position and when the main body 6 of the developing device is mounted while the elevating-lowering member 154 is at the lowered position, the developing section 4 is held at the operating position. When the elevating-lowering member 154 is at the elevated position, the acting portion 158 of the elevating-lowering member 154 is at the same level as the substantially horizontal part of the guide portion 128 as shown in FIGS. 9-A and 9-B. Accordingly, when the main body 6 of the developing device is mounted in position, the developing section 4 is kept at the non-operating position by the action of the acting portion 158. Thus, to bring the developing section 4 to the operating position the elevating-lowering member 154 should be moved to the lowered position. On the other hand, when the elevating-lowering member 154 is at the lowered position, the acting portion 158 of the elevating-lowering member 154 is substantially on the same level as the lower end of the inclined other end portion 128a of the guide member 128. Hence, the protruding piece 132 of the development housing 8 is moved downwardly along the other end portion 128a of the guide portion 128 just prior to mounting the main body 6 in position. When by this movement, the main body 6 is mounted in position, the developing section 4 is held at the operating position. The developing device further has the described below. When the engagement of the engaging member 60 is cancelled and the main body 6 of the developing device is moved in the detaching direction, the holding member 264 is moved in the direction of arrow 148 relative to the development housing 8 by the action of the biasing spring 278. When the main body 6 of the developing device is moved slightly in the direction of arrow 260, the hampering surface 270a of the holding member 264 and the engaging surface 276 of the supporting section 2 come into engagement with each other because the developing section 4 is at the non-operating position (as shown in FIGS. 9-A and 10-A), (when the elevating-lowering member 154 is at the elevated position, the developing section 4 is kept at the non-operating position, and as shown in FIGS. 9-A and 9-B, when the elevating-lowering member 154 is at the lowered position, the developing section 4 is brought from the operating position to the non-operating position incident to the movement of the main body 6 of the developing device in the direction of arrow 260). Then, the holding member 264 abuts against the hampering member 282 provided in the development housing 8 and is thus held at the engaging position as shown in FIG. 9-A or 10-A. Accordingly, even when the main body 6 of the developing device is detached from the main body of the image-forming machine, the holding member 264 is held at the engaging position and the developing section 4 continues to be held at the non-operating position. When the main body 6 of the developing device is further moved, the pair of supporting pins 120 no longer extend into recessed receiving portions 52 of the supporting section 2. In the illustrated embodiment, after connecting terminal 56 mounted on the supporting section withdraws from the other connecting terminal 119 mounted on the front base plate 116, the recessed receiving portions 52 withdraw from the supporting pins 120. This ensures disconnecting of the grounding of the electric motor 122 after the power supply for the main body 6 of the developing device is turned off. In this regard, when the main body 6 of the developing device is to be mounted, the connecting terminals 56 and 116 are connected to each other after the supporting pins 120 have been received in the recesses 52. Hence, by moving the supporting section 2 in the axial direction of the supporting pins 120, the two connecting terminals 56 and 116 are surely disconnected from each other. When thereafter the main body 6 of the developing device is further moved in the direction of arrow 260, the main body 6 of the developing device is detached exactly from the main body of the image-forming machine.

TONER CARTRIDGE AND RELATED ELEMENTS

Now, with reference to FIGS. 11 and 12 in conjunction with FIG. 2, the toner cartridge and related elements will be described.

Figure 11:
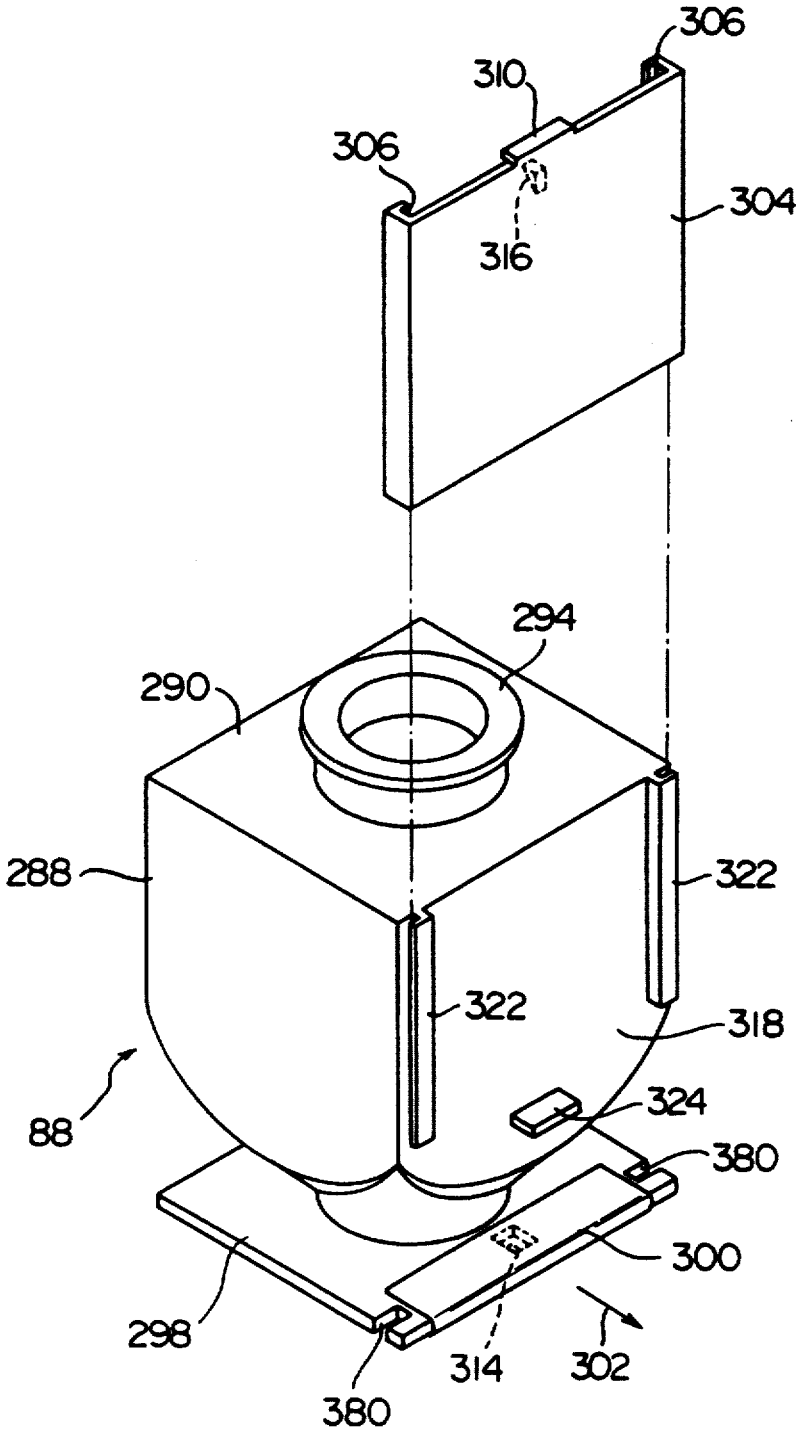
FIG. 11 is a perspective view showing a toner cartridge detachably loaded into the main body of the developing device.

Mainly with reference to FIG. 11, the illustrated toner cartridge 88 has a square-columnar main body 288. The main body 288 has an upper wall 290 having a toner supply opening 292 (FIGS. 14-A to 14-C) defined therein. After filling toner, the toner supply opening 292 is closed by a closure 294. The lower end portion of the main body 288 is funnel-shaped and a toner discharge opening 296 (FIGS. 14-A to 14-C) is defined at its lower end. In the illustrated embodiment, a rectangular flange 298 is intergrally provided at the lower end of the main body 288. By applying a flexible sheet material 300 to the under surface of the flange 298, the toner discharge opening 296 of the main body 288 is substantially sealed up. To make detachment of the sheet material 300 easy, it has *an* end portion bent upwardly and bonded to the upper surface of the flange 298. Accordingly, the sheet material 300 can be easily stripped from the flange 298 by removing its one end portion bonded to the upper surface of the flange 298 and pulling it in the direction shown by an arrow 302.

The toner cartridge 88 further includes a cover member 304 for closing the toner discharge opening 296 at the time of detaching the main body 288 of the toner cartridge from the main body 6 of the developing device. The illustrated cover member 304 is nearly rectangular corresponding to the shape of the flange 298 and flanges defining grooved portions [506] *306* for receiving the two side end portions of the flange 298 are defined at both side ends of the cover member 304. Hence, the toner discharge opening 296 of the main body 288 can be closed by positioning the two side end portions of the flange 298 in the grooved portions 306 of the cover member 304 and moving the cover member 304 to main body 288 in the direction shown by an arrow 308 (FIG. 14-B) as shown in FIG. 14-C. Incidentally, as shown in FIGS. 11 and 14-C, a stop piece 310 for surely limiting the movement of the cover member 304 in the direction of arrow 308 when the cover member 304 has been mounted in position on the flange 298 is preferably provided in the cover member 304.

In the illustrated embodiment, the toner cartridge is constructed such that the cover member 304 cannot be substantially moved in the detaching direction when it has been mounted on the flange 298 of the main body 288 of the toner cartridge. Specifically, as shown in FIGS. 11 and 14-C, detaching movement hampering means 312 is provided in the flange 298 and the cover member 304. The illustrated detaching movement hampering means 312 is comprised of a combination of a hole 314 (constituting a depressed portion) formed in the flange 298 and an engaging projecting portion 316 formed on the cover member 304. The engaging projecting portion 316 is inclined downwardly in the mounting direction of arrow 308 at its forward part with respect to the mounting direction, but substantially projects vertically at its rear end with respect to the mounting direction. Hence, when the cover member 304 is moved in the direction of arrow 308, the hole 314 and the engaging projecting portion 316 are engaged with each other by the elastic deformation of the flange 298 and the engaging projecting portion 316. After the hole 314 and the engaging projecting portion 316 have come into engagement, it is substantially impossible to move the engaging projecting portion 316 and therefore, the cover member 304, in a direction opposite to the direction 308. If desired, it is possible to provide the engaging protruding portion on the flange 298 and the receiving depressed portion in the cover member 304, contrary to the illustrated arrangement.

In the illustrated embodiment, the cover member 304 is constructed such that when it is not used, it is detachably mounted on one side wall 318 (the rear side wall as viewed with respect to the mounting direction of the cartridge main body 288 shown by an arrow 320 in FIG. 14-A) of the main body 288 of the toner cartridge. A pair of L-shaped supporting protrusions 322 spaced from each other are provided on the side wall 318 of the main body 288. Each of the supporting protrusions 322 extends vertically and has a projecting portion adapted to be positioned in the a respective grooved portion 306 of the cover member 304. A stop piece 324 is provided in the lower end portion of the side wall 318. Hence, as shown in FIGS. 11 and 14-A, the cover member 304 is detachably mounted on the side wall 318 of the main body 288 by positioning the projecting portions of the supporting protrusions 322 in the grooved portions 306 of the cover member 304 and moving the cover member 304 downwardly. Upon such mounting, the lower edge of the cover member 304 abuts against the stop piece 324 and is held in the state shown in FIG. 14-A. In this mounted state, the upper end portion of the cover member 304 projects slightly upwardly from the upper wall 290 of the main body 288 of the toner cartridge. By holding the projecting upper end portion and moving it upwardly, the cover member 304 can be easily detached from the side wall 318. Incidentally, it will be easily appreciated that the cover member 304 may be adapted to be mounted on the flange 298 of the main body 288 instead of on the side wall 318, and in this arrangement it is necessary to store the cover member 304 when the cartridge 88 is in use. (Furthermore, in this arrangement, to prevent substantial engagement between the hole 314 of the flange 298 and the engaging projecting portion 316 of the cover member 304, it is necessary to cover the hole 314 substantially by applying the sheet material 300 to at least the under surface of the flange 298).

Mainly with reference to FIGS. 2 and 12, the cartridge loading portion 82 of the main body 6 of the developing device into which the cartridge main body 288 is loaded detachably has four side walls and is nearly cylindrical, and a nearly rectangular flange 326 is provided at its upper end. A seal member 328, such as a sponge, capable of being elastically deformed is bonded to the inner circumferential part of the flange 326. A guide cover 332 is attached to the outer circumferential part of the flange 326 by means of securing screws 330. The guide cover 332 defines a pair of guide grooves 334 extending in the loading direction of the cartridge main body 288 in cooperation with the flange 326 at both side portions. At nearly the central portion of the guide cover 332 is formed a nearly semicircular opening 336 opened at one end (on the loading side of the main body 288). In order to permit easy loading of the cartridge main body 288, it is preferred to enlarge the openings of the guide grooves 334 by upwardly inclining one end portion of the guide cover 332 at both side portions thereof in a direction opposite to the loading direction of the cartridge main body 288 shown by arrow 320. A rotating shaft 340 is rotatably mounted on one side wall 338 (the side wall located at right bottom in FIG. 2) of the cartridge loading portion 82. One end portion of the rotating shaft 340 projects outwardly through the side wall 338, and this projecting end portion is drivingly connected to an output shaft 342 of the electric motor 122. In the illustrated embodiment, a receiving depressed portion or slot 344 is provided in one end portion of the rotating shaft 340 and an engaging pin 346 is provided on the output shaft 342. By inserting the engaging pin 346 into the depressed portion 344, the rotating shaft 340 is drivingly connected to the output shaft 342. The other end portion of the rotating shaft 340 projects inwardly through the side wall 338 and the helical member 98 of the toner transfer means 34 is connected to this inwardly projecting end portion of the rotating shaft 340 (see FIGS. 13-A and 13-B). In relation to the rotating shaft 340, discharge facilitating means 348 is provided in order to increase the dischargeability of the toner in the cartridge main body 288. With reference to FIG. 13-A also, the illustrated discharge facilitating means 348 is equipped with a supporting shaft 350 (which extends substantially vertically with respect to the rotating shaft 340) supported rotatably between the facing end walls of the cartridge loading portion 82. An actuating piece 352 is attached to an intermediate part of the supporting shaft 350 by means of a securing screw 354, and an oscillating member 356 is attached to one end of shaft 350 located within the toner discharge chamber 86. The oscillating member 356 projects outwardly through an opening 357 formed in the side wall 338 and a projecting portion 356a positioned above the rotating shaft 340 is provided at the free end portion of the oscillating member 356. On the other hand, an actuating protrusion 358 extending radially outwardly is provided on the peripheral surface of the rotating shaft 340, and this actuating protrusion 358 is adapted to act on the projecting portion 356a of the oscillating member 356. In the illustrated embodiment, a biasing spring 360 is attached to the oscillating member 356. One end portion of the biasing spring 360 is engaged with the oscillating member 356 and its other end portion is engaged with part of the cartridge loading portion 82. The biasing spring 360 biases the oscillating member 356 in the direction shown by an arrow 362 (FIG. 13-A), whereby the oscillating member 356 is usually held at an angular position shown in FIG. 13-A at which the front end portion of the actuating piece 352 abuts at the under surface of the flange 298 of the cartridge main body 288. Accordingly, when the electric motor 122 is totated in a predetermined direction, the helical member 98 is similarly rotated via the rotating shaft 340, and the toner discharged into the toner discharge chamber 86 is transferred in the direction of arrow 96 (FIG. 2) in the toner transfer chamber 32 (FIG. 1) by the action of the helical member 98. Furthermore, when the rotating shaft 340 thus rotates, the actuating protrusion 358 provided in the rotating shaft 340 acts on the projecting portion 356a of the oscillating member 356 to oscillate the oscillating member 356 in the directions shown by arrows 362 and 364. Specifically, when with the rotation of the rotating shaft 340 in the direction of arrow 366 (FIG. 2), the actuating protrusion 358 acts on the projecting portion 356a and elevates it, the oscillating member 356 is pivoted in the direction of arrow 364 against the biasing force of the biasing spring 360 (FIG. 13-B). When the rotating shaft 340 further rotates and the actuating protrusion 358 passes the projecting portion 356a, the oscillating , member 356 is pivoted in the direction of arrow 362 by the biasing action of the biasing spring 360, and the front end portion of the actuating piece 352 provided in the supporting shaft 350 collides with the flange 298 of the main body 288 (FIG. 13-A). The collision of the actuating piece 352 results in an impact on the cartridge main body 288, whereby any blocking of the toner in the [carridge] *cartridge* main body 288 is eliminated and discharge of the toner is ensured. Furthermore, the toner remaining on the inner surface of the main body 288 also is caused to fall. Thus, the discharge of the toner within the cartridge main body 288 is facilitated, and the toner is surely discharged.

The developing device in the illustrated embodiment is also constructed such that unless the cover member 304 is mounted on the main body 288 of the cartridge, the cartridge cannot substantially be detached from the cartridge loading portion 82 of the main body 6 of the developing device. Again, with reference to FIGS. 2 and 12, a pair of downwardly extending supporting protrusions 368 are provided on the under surface of the flange 326 of the cartridge loading portion 82 in the illustrated embodiment. An engaging member 370 is mounted vertically movable between the pair of supporting protrusions 368. The engaging member 370 has a main body portion 372 mounted movably on the supporting protrusions 368 and a pair of engaging claw portions 374 provided respectively at opposite ends of the main body portion 372. A biasing spring member 378 is interposed between an engaging member 376 attached to the lower end of each supporting protrusion 368 and the main body portion 372. The biasing spring member 378 elastically biases the engaging member 370 upwardly. If desired, instead of the above arrangement, it is also possible to provide the engaging member 370 intergrally with the flange 326 and form a slit in the joining area between the flange 326 and the engaging member 370, and thus permit the pair of engaging claw portions 374 to move vertically by the elastic deformation of the main body portion 372 of the engaging member 370. On the other hand, a pair of notches 380 corresponding to the pair of engaging claw portions 374 of the engaging member 370 are provided in the two side end portions of the flange 298 in the cartridge main body 288 (see FIG. 11). The pair of notches 380 extend inwardly from both side ends of the flange 298 and define receiving portions for receiving the engaging claw portions 374. As shown in FIG. 2, notches 382 through which the engaging claw portions 374 of the engaging member 370 can pass are formed in the flange 326 of the cartridge loading portion 82.

Now, with reference to FIGS. 14-A to 14-C, the operations of loading and detaching the cartridge main body 288 will be described.

In loading the main body 288 on the cartridge loading portion 82, both side end portions of the flange 298 are positioned in the pair of guide grooves 334 defined in the cartridge loading portion 82 and moved in the loading direction shown by arrow 320 (FIG. 14-A). As a result, the two side end portions of flamnge 298 are guided by the pair of guide grooves 334 and the main body 288 is positioned at the loaded position shown in FIG. 14-A (by the abutting of the left end in FIG. 14-A of the flange 298 against the end wall 332a of the guide cover 332, the movement of the main body 288 beyond the loaded position is hampered). As a result, as shown in FIG. 14-A, the pair of engaging claw portions 374 of the engaging member 370 pass through the notches 382 formed in the flange 326 and project into the notches 380 formed in the flange 298 of the cartridge main body 288, and are surely engaged with the flange 298. As shown in FIG. 14-A, the engaging claw portions 374 are substantially vertical at the front end and inclined downwardly toward their rear end when viewed in the loading direction of arrow 320. Hence, when the engaging claw portions 374 come into engagement with part of the flange 298, the movement of the cartridge main body 288 in the detaching direction of arrow 384 (FIG. 14-B) is surely prevented, and unless the cover member 304 is mounted, the cartridge main body 288 cannot be detached.

Then, part of the sheet material 300 bonded to the flange 298 in the cartridge main body 288 is peeled and pulled to detach it completely from the flange 298. As a result, the toner discharge opening 296 of the cartridge main body 284 is exposed, and the toner in the cartridge main body 288 is discharged into the toner discharge chamber 86 through the toner discharge opening 296.

On the other hand, to detach the cartridge main body 288 from the cartridge loading portion 82, the cover member 304 is detached from the side wall 318 (FIG. 11) of the cartridge main body 288 and is inserted between the flange 326 of the cartridge loading portion 82 and the flange 298 of the main body 288 and moved in the direction of arrow 308 as far as the position shown in FIG. 14-B. (The movement of the cover member 304 beyond this position can be hampered by the abutting of the stop piece 310 provided in the cover member 304 against the right end of the flange 298 as viewed in FIG. 14-B). Since the engaging claw portions 374 are inclined upwardly in the loading direction shown by arrow 308, the insertion of the cover member 304 is permitted. With the movement of the cover member 304 in the loading direction, the engaging member 370 is moved downwardly against the biasing force of the biasing spring 378. When the cover member 304 covers the under surface of the flange 298, the pair of engaging claw portions 374 move from the notches 380 to permit movement of the cartridge main body 288 in the detaching direction shown by arrow 384. When the cover member 304 is so mounted, the toner discharge opening 296 of the cartridge main body 288 is closed by the cover member 304, and its engaging projected portion 316 is positioned in the hole 314 formed in the flange 298. Thus, the movement of the cover member 304 in the detaching direction with respect to the cartridge main body 288 can be exactly hampered.

Thereafter, the cartridge main body 288 is moved in the detaching direction of arrow 384 together with the cover member 304. As a result, as shown in FIG. 14-C, the cartridge main body 288 can be detached while its toner discharge opening 296 is covered by the cover member 304. Even when some amount of toner is present within the cartridge main body 288, it cannot scatter outside.

MODIFIED EMBODIMENTS

While the invention has been described with regard to one embodiment of the developing device constructed in accordance with this invention, it should be understood that the invention is not limited to this specific embodiment, and various changes and modifications are possible without departing from the scope of the invention as described and claimed herein.

For example, in the illustrated embodiment, the mechanisms relating to the cover member 304 are described with regard to an embodiment in which the cartridge main body 288 is loaded into one end portion of the developing section 4 of the developing device 6. This is not limitative, however. The invention equally applies to an embodiment in which the cartridge main body is loaded detachably in the toner holding chamber of the developing device.

Furthermore, in the illustrated embodiment, one developing device is detachably mounted around the rotating drum 42. If desired, for monocolor copying of a multiplicity of colors, two or more developing devices may be detachably mounted around the rotating drum 42, as described, for example, in the specification and drawings of Japanese Patent Application No. 235929/1986.

What is claimed is:

1. A developing device for developing an image in an image forming machine, said developing device comprising:

a main body including a supporting section to be connected to the image forming machine and a developing section having applicator means for applying a developer to a latent electrostatic image of the image forming machine, said developing section being turnably connected to said supporting section for movement relative thereto over a predetermined range between an operating position, whereat developer on said applicator means acts on an image-bearing means on which the latent electrostatic image is formed, and a non-operating position, whereat developer on said applicator means substantially does not act on the image-bearing means;

a changeover mechanism for selectively moving said developing section relative to said supporting section between said operating and non-operating positions; and positioning means, operatively controlled by said changeover mechanism, for, when said changeover mechanism moves said developing section to said operating position thereof, movement to an operating state whereat said positioning means acts on said developing section and holds said developing second in said operating position thereof, and for, when said changeover mechanism moves said developing section to said non-operating position thereof, movement to a non-operating state substantially not acting on said developing section.

2. The developing device of claim 1, wherein said changeover mechanism comprises biasing means for biasing said developing section toward said operating position thereof, and an elevating-lowering member for bringing said developing section to said non-operating position against the biasing action of said biasing means, whereby, when said elevating-lowering member is lowered said developing section is brought to said operating position by said biasing action of said biasing means, and when said elevating-lowering member is elevated said developing section is brought to said non-operating position by said elevating-lowering member against said biasing action of said biasing means.

3. The developing device of claim 2, wherein said changeover mechanism further comprises cam means for elevating or lowering said elevating-lowering member such that, when said cam means is brought to a second angular position from a first angular position, said elevating-lowering member is lowered and said developing section is held at said operating position, and, when said cam means is brought to said first angular position from said second angular position, said elevating-lowering member is elevated and said developing section is held at said non-operating position.

4. The developing device of claim 3, wherein said positioning means comprises a moving member capable of reciprocal motion in response to turning of said cam means, and a pressing member movable by said moving member between a first position, at which said pressing member holds said developing section at said operating position, and a second position, at which said pressing member substantially does not act on said developing section, such that when said cam means is at said second angular position thereof said pressing member is held at said first position thereof by said moving member, and when said cam means is at said first position thereof said pressing member is held at said second position thereof by said moving member.

5. The developing device of claim 4, further comprising elastic biasing means attached to said pressing member for, when said cam means is at said second angular position thereof, elastically holding said developing section at said operating position thereof.

6. A developing device for developing an image in an image forming machine, said developing device comprising:

a main body adapted to be detachably mounted on a main frame of the image forming machine, said main body including a supporting section to be connected to the main frame of the image forming machine and a developing section having applicator means for applying a developer to a latent electrostatic image of the image forming machine, said developing section being turnably connected to said supporting section for movement relative thereto over a predetermined range between an operating position, whereat developer on said applicator means acts on an image-bearing means on which the latent electrostatic image is formed, and a non-operating position, whereat developer on said applicator means substantially does not act on the image-bearing means;

biasing means for biasing said developing section relative to said supporting section to said operating position of said developing section; and means for holding said developing section at said non-operating position thereof relative to said supporting section, in opposition to the biasing force of said biasing means, during mounting of said main body on and detachment of said main body from the main frame of the image forming machine and when said main body is fully detached from the main frame of said image forming machine.

7. The developing device of claim 6, wherein said holding means for holding said developing section at said non-operating position thereof comprises a holding member mounted on said main body for movement relative thereto in a direction parallel to the direction of movement of said main body during mounting and detachment thereof, said holding member including a turn hampering portion for acting on a part of said supporting section for hampering turning of said developing section relative to said supporting section such that, when said main body of said developing device is detached from the image-forming machine, said turn hampering portion of said holding member engages said part of said supporting portion to hold said developing section at said non-operating position, and when said main body of said developing device is fully mounted exactly on the main frame of the image-forming machine, the engagement of said turn hampering portion of said holding member with said part of said supporting section is cancelled and thus the holding thereby of said developing section at said non-operating position is canceled.

8. The developing device of claim 7, further comprising second biasing means for biasing said holding member toward an engaging position at which said turn hampering portion engages said part of said supporting section, and a hampering member provided on said developing section for hampering the movement of said holding member beyond said engaging position.

9. The developing device for claim 6, further comprising guide means for guiding said developing section during mounting and detachment movement of said main body relative to the main frame of image-forming machine.

10. A developing device for developing an image in an image forming machine, said developing device comprising:

a main body including applicator means for applying a developer to a latent electrostatic image, said main body having a toner inlet opening;

a toner cartridge adapted to contain toner and having a toner [outlet] *discharge* opening;

said toner cartridge being selectively detachably mountable on said main body with said toner [outlet] *discharge* and inlet openings aligned such that toner may be supplied from said cartridge into said main body;

[a cover member selectively mountable on said cartridge in a position to block said discharge opening; and means for preventing detachment of said cartridge from said main body unless said cover member is mounted in said position on said cartridge.]

*means for preventing detachment of said cartridge from said main body; and*

*cover member means operable for releasing said detachment preventing means to enable said cartridge to be detached from said main body and selectively remov-*

*ably mountable on said cartridge for blocking said discharge opening.*

11. The developing device of claim 10, wherein said preventing means comprises a receiving portion defined in said cartridge, and an engaging member detachably receivable in said receiving portion and [mounted] *provided* on said main body such that when said toner cartridge is mounted on said main body said engaging member is received in said receiving portion of said cartridge to thereby render substantially impossible the detachment of said cartridge from said main body, and when said cover member is mounted on said cartridge [said cover member removes] said engaging member *is removed* from said receiving portion of said cartridge to permit detachment of said cartridge from said main body.

12. Thedeveloping device of claim 11, wherein said engaging member is mounted on said main body to be vertically movable, further comprising biasing means for biasing said engaging member upwardly, and wherein the upper end of said engaging member is inclined upwardly in the direction of mounting of said cover member, such that when said cartridge is mounted on said main body said engaging member is received in said receiving portion of said cartridge by the action of said biasing means, and when said cover member is mounted on said cartridge, said engaging member is removed from said receiving portion of said cartridge due to movement of said cover member in said direction of mounting against the biasing action of said biasing means.

13. The developing device of claim 10, further comprising detaching movement hampering means provided on said cartridge and said cover member for hampering detachment of said cover member after said cover member has been mounted on said cartridge.

14. The developing device of claim 13, wherein said detaching movement hampering means comprises a recessed receiving portion provided in one of said cartridge and said cover member and an engaging projecting portion provided in the other of said cartridge and said cover member and adapted to be received in said recessed receiving portion.

15. The developing device of claim 10, further comprising means for detachably mounting said cover member on a side wall of said cartridge when said cover member is not in use.

16. The developing device of claim 10, wherein said toner discharge opening of said cartridge is sealed by a flexible sheet material, such that by mounting said cartridge on said main body and thereafter removing said flexible sheet material, said toner discharge opening is exposed and the toner in said cartridge is supplied into said main body.

17. A developing device for developing an image in an image forming machine, said developing device comprising:

a main body adapted to be detachably mounted on a main frame of an image forming machine, said main body including a supporting section to be connected to the image forming machine and a developing section having applicator means for applying a developer to a latent electrostatic image of the image forming machine, said developing section being turnably connected to said supporting section for movement relative thereto over a predetermined range between an operating position, whereat developer on said applicator means acts on an image-bearing means on which the latent electrostatic image is formed, and a non-operating position, whereat developer on said applicator means substantially does not act on the image-bearing means; and first electrical connector means to be mounted on the main frame of the image forming machine and second electrical connector means mounted on said supporting section at relative positions such that, when said main body is moved in a direction to be mounted on the main frame of the image forming machine, said second electrical connector means automatically is electrically coupled with said first electrical connector means.

18. The developing device of claim 17, further comprising a changeover mechanism for selectively moving said developing section relative to said supporting section between said operating position and said non-operating position.

19. The developing device of claim 17, further comprising a pair of recessed receiving portions mounted on said main body, and a pair of supporting pins to be received in said pair of recessed receiving portions and to be mounted on the main frame of the image forming machine, such that when said main body is mounted on the main frame of the image forming machine said pair of supporting pins are received in said pair of recessed receiving portions and thereafter first and second electrical connector means are electrically coupled to each other.

*20. An assembly to be assembled to an image developing device of an image forming machine, said assembly comprising:*

*a cartridge to contain toner and having a toner discharge opening, said cartridge being selectively detachably mountable on a main body of the developing device such that said toner discharge opening will align with a toner inlet opening of the main body and such that toner may be supplied therethrough from said cartridge to the main body;*

*said cartridge having a receiving portion to receive an engaging member of the main body when said cartridge is mounted thereon, and thereby preventing removal of said cartridge; and*

*cover member means operable for removing the engaging member of the main body from said receiving portion of said cartridge, thereby for enabling said cartridge to be removed from the main body, and selectively removably mountable on said cartridge for blocking said discharge opening.*

*21. An assembly as claimed in claim 20, further comprising detaching movement hampering means provided on said cartridge and said cover member for hampering detachment of said cover member from said cartridge.*

*22. The developing device of claim 10, wherein said cover member means is removed from said cartridge when said discharge and inlet openings are aligned.*

*23. An assembly as claimed in claim 20, wherein said cover member means is removed from said cartridge when said discharge opening is positioned to align with the inlet opening.*

* * * * *